US011236818B2

(12) United States Patent
Soave et al.

(10) Patent No.: US 11,236,818 B2
(45) Date of Patent: Feb. 1, 2022

(54) LEVER SHIFTER WITH AUTO RETURN TO PARK AND LOCK FUNCTION

(71) Applicant: Kuster North America, Inc., Troy, MI (US)

(72) Inventors: Christopher Soave, Oxford, MI (US); Calogero Alu, Shelby Charter Township, MI (US)

(73) Assignee: Kuster North America, Inc., Troy, MI (US)

( * ) Notice: Subject to any disclaimer, the term of this patent is extended or adjusted under 35 U.S.C. 154(b) by 0 days.

(21) Appl. No.: 17/115,926

(22) Filed: Dec. 9, 2020

(65) Prior Publication Data

US 2021/0172512 A1    Jun. 10, 2021

Related U.S. Application Data

(60) Provisional application No. 62/946,046, filed on Dec. 10, 2019.

(51) Int. Cl.
*F16H 59/10* (2006.01)
*F16H 63/48* (2006.01)
*F16H 19/08* (2006.01)
*B60K 20/04* (2006.01)
*F16H 59/02* (2006.01)

(52) U.S. Cl.
CPC ........... *F16H 59/105* (2013.01); *B60K 20/04* (2013.01); *F16H 19/08* (2013.01); *F16H 63/483* (2013.01); *F16H 2059/026* (2013.01); *F16H 2059/0295* (2013.01)

(58) Field of Classification Search
CPC ..... F16H 2059/0295; F16H 2059/0282; F16H 2059/026; F16H 59/105; F16H 63/483; F16H 19/08; B60K 20/04
See application file for complete search history.

(56) References Cited

U.S. PATENT DOCUMENTS

| 6,298,742 | B1 | 10/2001 | Ey |
| 8,485,061 | B2 | 7/2013 | Kliemannel et al. |
| 9,416,875 | B2 | 8/2016 | Kim |
| 9,620,309 | B2 | 4/2017 | Hoskins et al. |
| 9,964,204 | B2 | 5/2018 | Redwood et al. |
| 9,966,204 | B2 | 5/2018 | McCauley et al. |
| 10,443,723 | B2 | 10/2019 | Bormann |

(Continued)

FOREIGN PATENT DOCUMENTS

WO     2018217865 A1    11/2018

*Primary Examiner* — William Kelleher
*Assistant Examiner* — Gregory T Prather
(74) *Attorney, Agent, or Firm* — Dinsmore & Shohl LLP

(57) ABSTRACT

A vehicle transmission shifter assembly including a housing pivotally supporting a shifter lever between Park, Reverse, Neutral, Drive and Manual shifter positions. A plurality of gate locations configured upon an underside of the housing and corresponding to each of Park, Reverse, Neutral and Drive gear positions. A gate lock incorporated into the lever and biased against a selected one of the gate locations. A PCB board with processor and sensor integrated into the housing communicating with a motor connected to the shifter lever. Upon the processor determining existence of a return to park condition, a return to park mechanism actuates the motor for returning the shifter lever to the Park position.

17 Claims, 29 Drawing Sheets

(56) References Cited

U.S. PATENT DOCUMENTS

| | | | |
|---|---|---|---|
| 10,465,792 B2 | 11/2019 | Schmidt et al. | |
| 2003/0029261 A1* | 2/2003 | DeJonge | B60K 37/06 |
| | | | 74/335 |
| 2006/0117893 A1 | 6/2006 | Shimizu et al. | |
| 2014/0224056 A1 | 8/2014 | Beaufils | |
| 2015/0176704 A1 | 6/2015 | Baek et al. | |
| 2017/0219095 A1* | 8/2017 | Beattie | F16H 61/22 |
| 2018/0112772 A1 | 4/2018 | Maitre et al. | |
| 2018/0283543 A1* | 10/2018 | Cha | F16H 61/22 |
| 2018/0320780 A1* | 11/2018 | Heo | F16H 57/0006 |

* cited by examiner

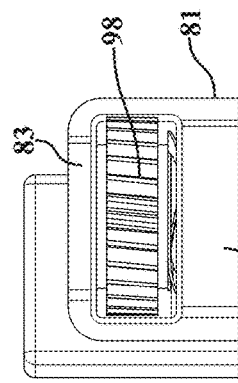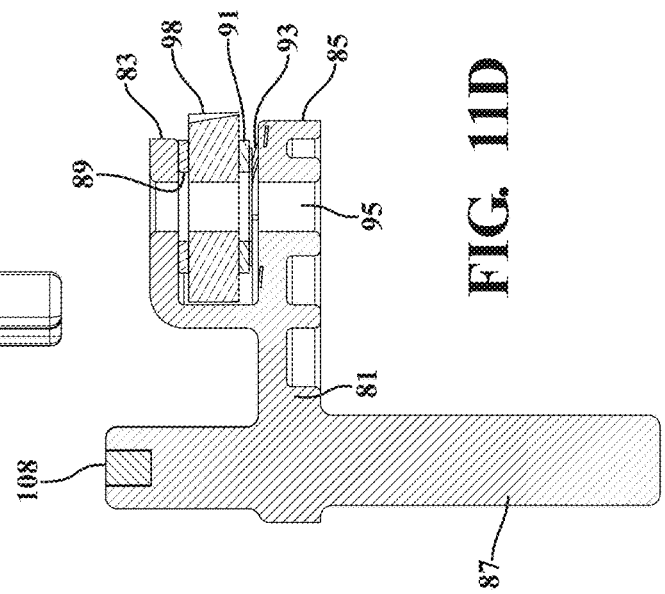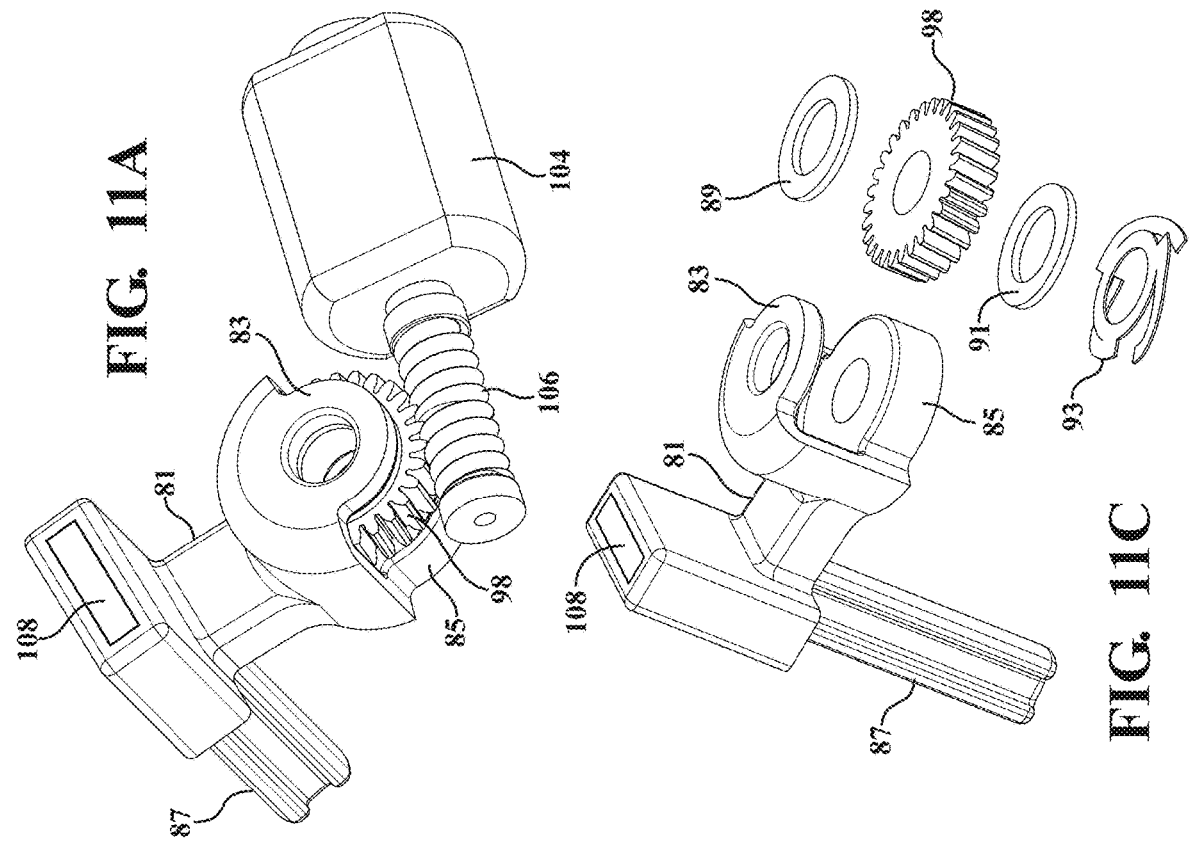

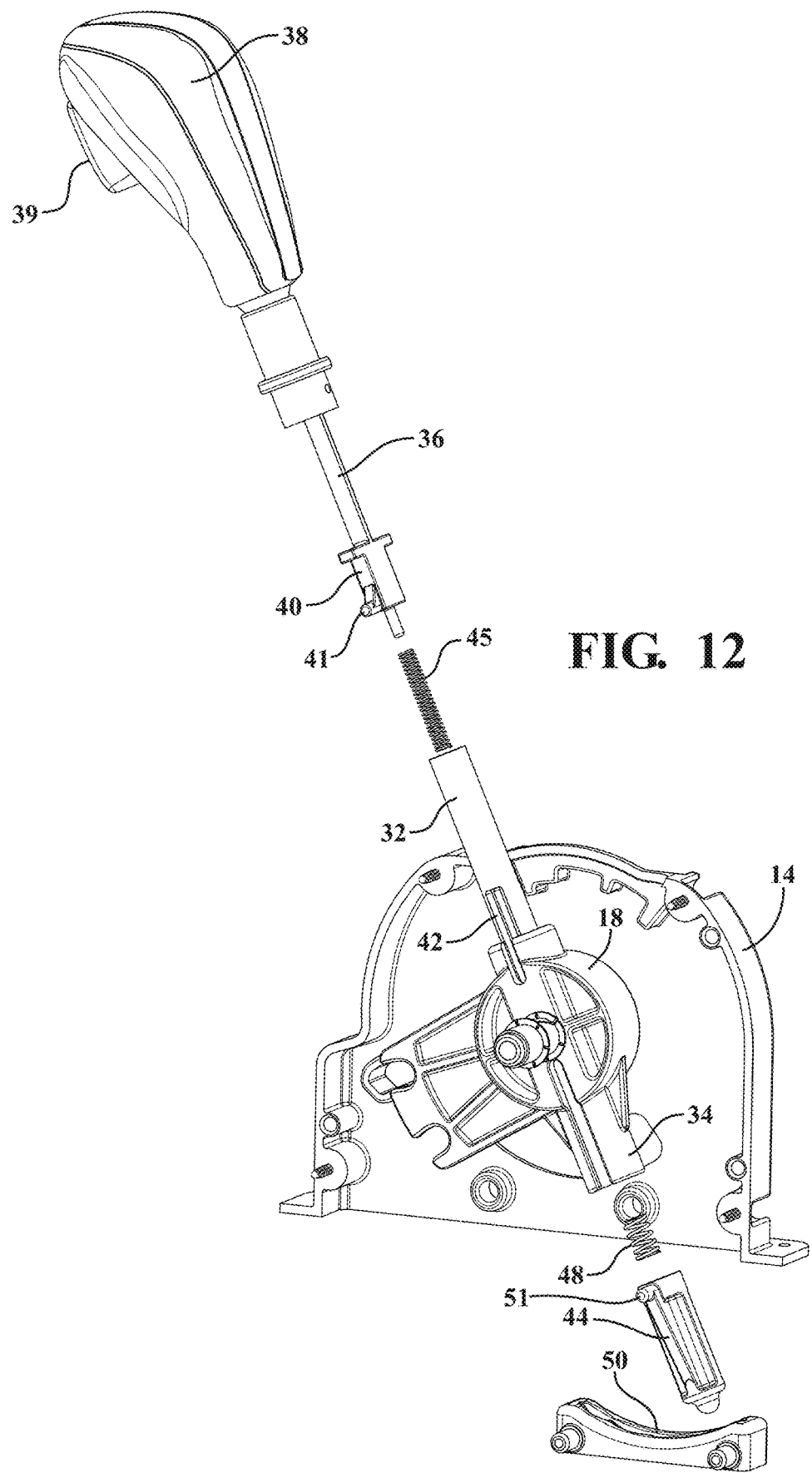

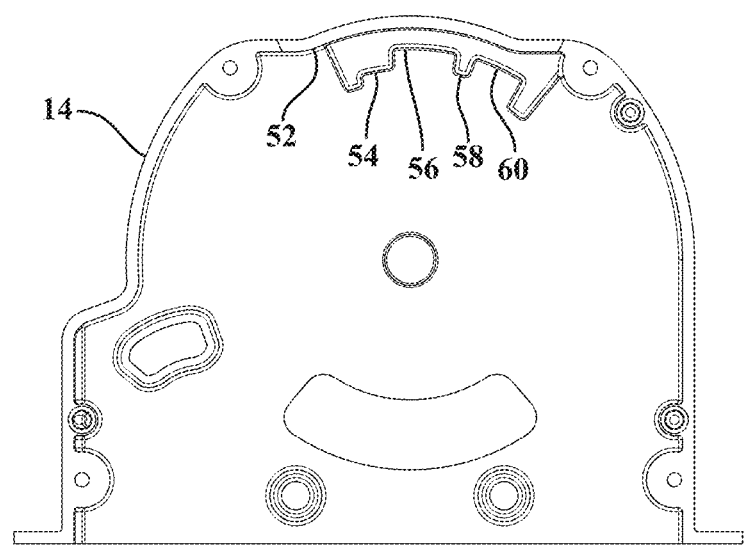
FIG. 13
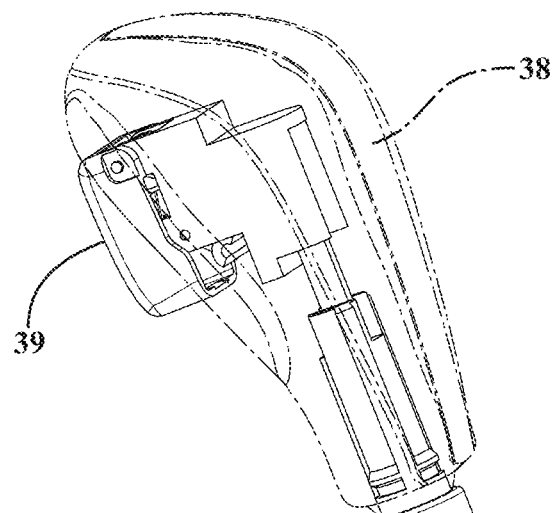
FIG. 14
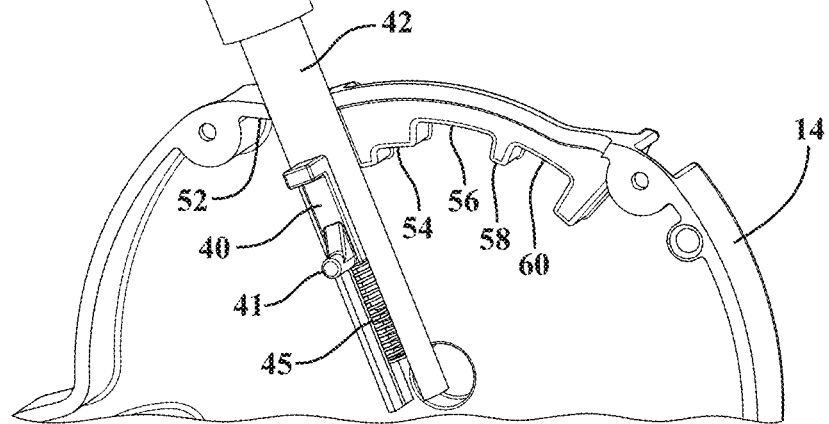

LEVER SHIFTER WITH AUTO RETURN TO PARK AND LOCK FUNCTION

CROSS REFERENCE TO RELATED APPLICATIONS

The present application claims the priority of U.S. Ser. No. 62/946,046 filed Dec. 10, 2020, the contents of which are incorporated by reference.

FIELD OF THE INVENTION

The present invention relates generally lever style vehicle shifter assemblies. More specifically, the present invention discloses a lever shifter incorporating a number of features including an operator lock for preventing binding of the assembly in each of the park and neutral positions. Additional features include providing operator haptic feel while shifting through the gear positions, providing stable positions in each of park, reverse, neutral, drive and manual positions, providing monostable one bump gear selection within the manual shift position, providing gated locations for preventing unintended shifting between each of park to reverse, reverse to park, neutral to reverse, drive to manual and manual to drive gear positions as well as providing a mechanism for allowing the operator to shift between the gated locations, and providing a return to park position on command.

BACKGROUND OF THE DISCLOSURE

The prior art is documented with numerous lever-style shifter mechanisms. A first example is set forth in US 2015/0176704 to Baek et al. which discloses an apparatus for moving a shift lever including an actuator to move the shift lever to a predetermined shift stage by applying a pressure to one side of the lever through a pressing member. A position detection unit detects the position of the pressing member and a control unit drives a driving unit which, in response to a stoppage of the pressing member as determined by the detecting unit, a driving force to the pressing member to eliminate the stoppage of the pressing member.

US 2006/0117893, to Shimizu, teaches a vehicular shift lock device for selectively inhibiting and permitting movement of a shift lever and includes a stopper member pivotable about an axis between a stopping position and a non-stopping position for respectively preventing and permitting a movement of a manually operable member provided to place the shift lock device in its unlocking state.

US 2018/0112772, to Maitre et al., teaches a gear change and selection lever in a mechanical motor vehicle gearbox. A pair of rods are arranged in a coaxial alignment and are separated by a detent ball engagement member extending perpendicularly and inserted into an insert. The engagement member cooperates with a cam in order to index different positions of the lever, the rods and the insert being over molded by a plastic material.

US 2014/0224056, to Beufils, teaches a lever having a trigger that is retractable against a travel limiter for engagement of the reverse gear. The lever is interlocked with a means for being switched from one position, allowing the engagement and selection of gears, to another position for applying the parking brake, with the possibility of selecting and engaging a gear. The lever base has a spherical body equipped with a multi-directional movement capability in a mounting, while being equipped for the engagement and selection of gears.

Other references of note include the rotary selector switch of U.S. Pat. No. 9,620,309 to Hoskins in electrical communication with a vehicle transmission for preventing accidental rotation to an undesired position. U.S. Pat. No. 9,964,204, to Redwood, further discloses an electronic selector switch assembly and method for a vehicle for periodically senses selector knob and transmission gear positions to determine if there is a mismatch, and locks the selector knob position and adjusts the rack position if there is a mismatch.

SUMMARY OF THE PRESENT INVENTION

The present invention discloses a straight gate vehicle transmission shifter assembly having multiple features including each of park and neutral lock function with anti-binding mechanism between associated gear and lock arm, poly-stable positions and gate positions of the shift lever, pawl and detent, monostable manual position, command return to park functionality, magnet to PCB sensor enabled position sensing and improved graphic display not limited to a segmented display subassembly for providing higher quality visual representations.

A housing pivotally supports a shifter lever between Park, Reverse, Neutral, Drive and Manual shifter positions. A PCB board with processor and sensor is integrated into the housing and connected to a motor. Upon the processor determining existence of a return to park condition, a return to park mechanism actuates the motor for returning the shifter lever to the Park position.

The return to park mechanism further incorporates a rotating cam component having an exterior toothed profile operable by an output gear of the motor in a given rotational direction in order to successively retract the shifter lever from its non-Park shifter position and then to pivotally rotate the shifter lever in a return direction toward the Park position. A stacked worm gear of the motor rotatably engages the exterior toothed profile of the rotating cam component via an interposed spur gear.

A bracket sensor is supported by the housing and, in response to pivoting of the cam component, displaces relative to the PCB sensor to signify achieving of the return to park condition of the shifter lever and to deactivate the motor. The cam component further includes circumferentially sloping surfaces which seat each of upper gate lock and lower pawl components spring loaded within the shifter lever.

The housing further includes a plurality of bosses configured within underside surface locations of the housing for engaging the gate lock corresponding to the shifter positions. The underside bosses further include poly stable gated locations in order to prevent unintended shifting of the shifter lever between each of the Park to Reverse, Reverse to Park, Neutral to Reverse, Drive to Manual or Manual to Drive shifter positions.

Other features include the pawl biasing against a detent plate, the pawl exhibiting an arcuate surface profile corresponding to the shifter positions in a reverse arrangement to the gate lock engaging bosses. A shift knob is supported atop the shifter lever and incorporates a depressible knob button for retracting the gate lock from a selected one of the underside bosses corresponding to a given shifter position. The shifter lever is monostable in the Manual shifter position and is alternatively pressed in a forward direction or pulled in an aft direction about a pivotal axis defined with the housing.

Additional features of the operator lock functioning in each of each of the Park and Neutral shifter positions includes each of a park lock lever engaged with the shifter lever, a park lock sensor lever pivotally coupled to the park lock lever via either a torsion spring in one variant or a friction lock based anti-bind mechanism in a further variant. A secondary motor is incorporated into the housing and has a powered worm gear for actuating the park lock sensor lever, with the torsion spring transferring the rotation of the park lock sensor lever to the park lock lever, and a park lock magnet supported on the park lock sensor lever providing feedback to a further sensor on the PCB board for indicating whether the park lock sensor lever has achieved a desired position.

A decoupling feature prevents binding of the park lock lever, and by which a binding condition results in permitted rotation of the park lock sensor lever in a unlock direction, this including again either the use of a torsion spring or, separately, the friction based mechanism. Upon clearing of an obstruction to the park lock lever, such as by the pre-load or interference being reduced below a level of force being exerted by the park lock torsion spring or the anti-binding friction mechanism, the torsion spring or friction inducing spring washer overcomes the preload/interference for resetting the mechanism to re-sync the park lock lever and park lock sensor lever to prevent the worm gear and park lock sensor lever gear from binding due to overload.

The housing also includes a central support structure against which are secured first and second outer side covers to define a pair of package receiving interiors, with a first of the interiors supporting the shifter lever, and the other of said interiors supporting the park lock lever, the park lock sensor lever, the motor and the PCB board. A channel is formed in the central support structure and through which extends a portion of the park lock lever for engaging the shifter lever in either of the Park or Neutral shifter positions.

A pivot shaft associated with the shifter lever is supported by the central support structure, a round magnet is incorporated into an end face of the pivot shaft in proximity to a further sensor of the PCB board and which is read by the processor to determine the shifter position. The shifter leaver further includes a structural extension proximate the extending portion of the park lock lever in either of the Park or Neutral shifter positions.

Other features include a graphical display positioned aside the shifter lever above the housing for displaying the shifter positions. An illuminating component is associated with the graphical display and further includes LED elements integrated into a surface display for presenting a pixelated image. The illuminating component can also include either of a thin film transistor display or an organic light emitting diode display and can also incorporate segmented LCD elements or panels.

BRIEF DESCRIPTION OF THE DRAWINGS

Reference will now be made to the attached drawings, when read in combination with the following detailed description, wherein like reference numerals refer to like parts throughout the several views, and in which:

FIGS. 11A-11D present a series of perspective, plan, exploded and section views of an alternate variant of anti-binding mechanism in comparison to that shown in FIGS. 10-11 and by which the torsional spring is replaced by a pair of friction locking spring washers arranged against opposite faces of the gear and which, upon the torque exerted upon the lock arm exceeding the torque prescribed to the friction (such associated a bind condition existing between the cross-helical gears), the lock arm supported wheel gear is permitted to slip within the device to prevent the gear system from binding due to overload;

FIG. 12 is a partial exploded view of the assembly shift lever with upper spring loaded gate lock and lower spring loaded pawl which respectively engage the gate profile configured on the underside of the housing and the lower positioned detent plate over the Park, Reverse, Neutral, Drive and Manual positions;

FIG. 13 is an inside plan view of a portion of the package defining housing and which depicts a plurality of bosses placed in specific gate positions;

FIG. 14 is an illustration of the shift lever with gate influenced spring in the Park position;

DETAILED DESCRIPTION OF THE PREFERRED EMBODIMENTS

As will be described with additional reference to attached illustrations, the present invention discloses a straight gate lever shifter with return to park (RTP) functionality (such as upon commend via a PCB sensor in communication with a motor operable to reset the shifter to the Park position). The shifter assembly incorporates a number of features including an operator lock for preventing binding of the assembly in each of the park and neutral positions. Additional features include providing operator haptic feel while shifting through the gear positions, providing stable positions in each of park, reverse, neutral, drive and manual positions, providing monostable one bump gear selection within the manual shift position, providing gated locations for preventing unintended shifting between each of park to reverse, reverse to park, neutral to reverse, drive to manual and manual to drive gear positions, as well as providing a mechanism for allowing the operator to shift between the gated locations.

Figure 1:
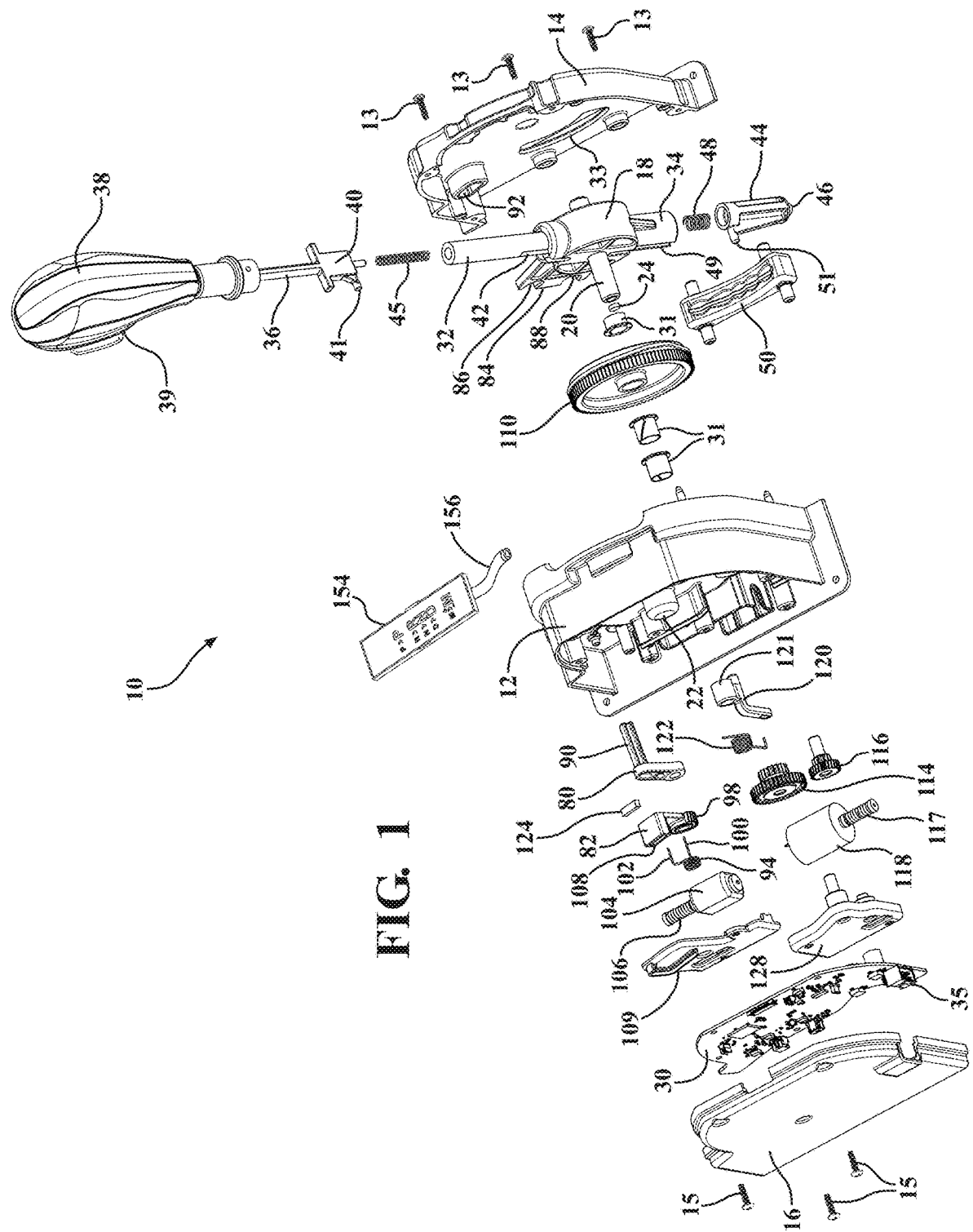
FIG. 1 is an exploded view of the straight gate lever shifter assembly according to a non-limiting embodiment of the present invention.

With initial reference to FIG. 1, an exploded view is generally referenced at 10 of the lever assembly according to a first embodiment of the present invention and includes a superstructure defining housing having a central support structure 12 against which are secured first 14 and second 16 outer side covers to define a pair of package interiors via opposing pluralities 13 and 15 of mounting screws. As will be further described in reference to FIGS. 13-20, an upper ledge underside of the selected outer side cover 14 incorporates a plurality of bosses in arcuate extending fashion in order to define various gate lock engageable shifter positions associated with the corresponding shifter lever. Although not clearly shown, it is further understood that matching gate bosses can be configured within the inside underside surfaces of both the left hand 12 and right hand 14 side housing covers.

Figure 34:
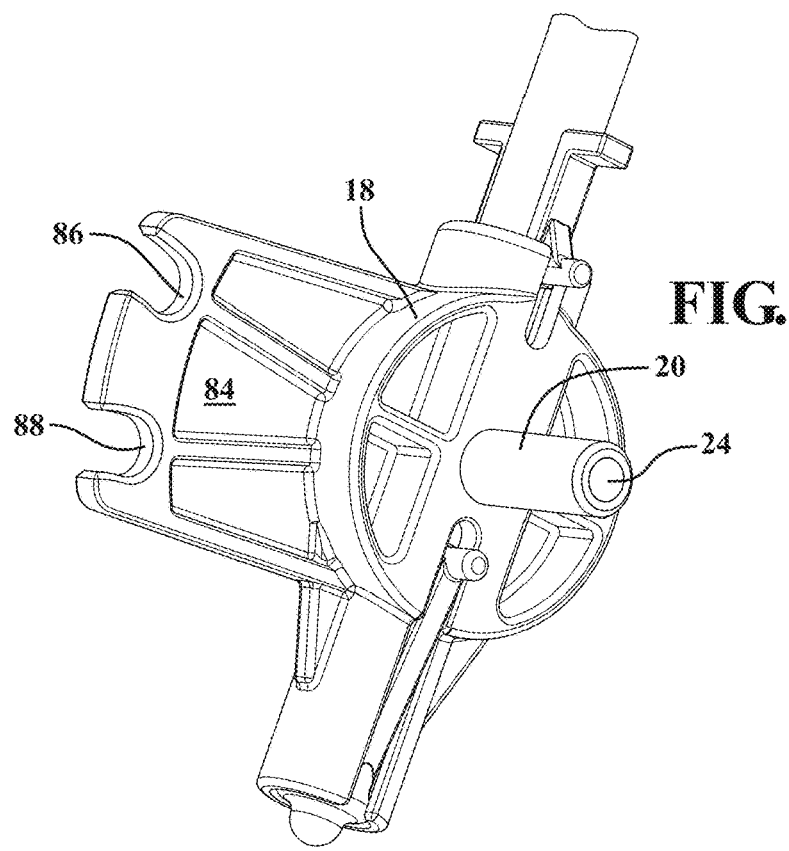
FIG. 34 is an illustration of the positioning sensor shifter magnet which is mounted to the shift lever, the rotation of which is sensed by the sensor on the circuit board.
Figure 35:
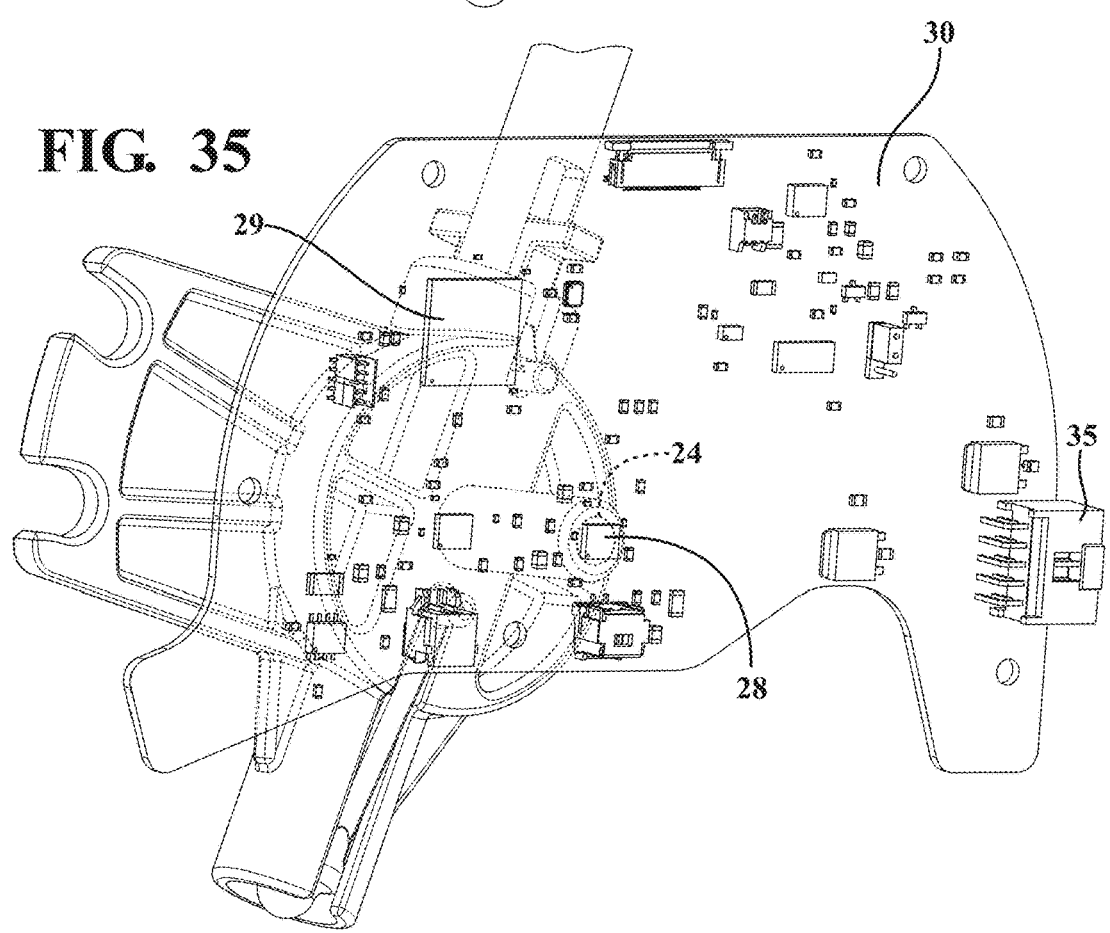
FIG. 35 is an illustration of the PCB and sensor positioning relative to the shift lever positioned magnet.

The shifter lever includes a central body 18 with an integrally formed pivot shaft 20 which is rotatably supported within an annular shaped and coaxially supporting journal location 22 defined in the central support structure 12. As also shown in FIG. 34, a rounded shaped magnet 24 is incorporated into an end face of the pivot shaft in proximity to a sensor 28 (see additionally FIG. 35) of a PCB board 30 in order to instruct, via an associated processor component 29 integrated into the PCB 30 at any location, a current shifter position. Also shown in FIG. 1 are a collection of bearings 31 for pivotally supporting the shifter lever along a determined overall arcuate range defined by an arcuate slot 33 defined in the outer side cover 14 through which projects a revers The PCB board 30 as shown is secured to the left hand inside of the central housing structure 12 and covered inside the second outer side cover 16 and, as will be further described, includes additional sensors for determining the existence of either of a Park lock or Neutral lock position or a return to park (RTP) condition. Also depicted at 35 in FIG. 35 is a receiving structure of the PCB board 30 to which is engaged a ribbon connector associated with a graphical display component (see at 140) as further described in FIG. 36.

The central body 18 of the shifter lever further includes both upper 32 and lower 34 integral and elongate extending housing portions which are depicted axial in relationship. Both the upper 32 and lower 34 portions are internally hollowed, with the upper portion 32 seating a shifter stem 36 and upper supported shift knob 38. With further reference to FIG. 12, a depressible shift button 39 is configured upon an underside of the shift knob 38.

The stem 36 incorporates a gate lock 40 with a pin projection 41, the gate lock. The gate lock 40 is mounted within a slotted range 42 associated with the upper stem portion 32 and is biased upwardly by a coil spring 45 against the underside configured bosses (further reference being made in FIG. 13) defined between the opposing mating edges of the assembled housings 12 and 14 and defining the first sub-compartment. A pawl 44 with a biasing bottom rounded portion 46 is likewise spring loaded (via coil spring 48) into an open and slotted lower range 49 of the lower stem portion 34 (see also FIGS. 3-7) and so that the pawl 44 is in contact with an arcuate surface of a detent component 50 mounted underneath the main superstructure. The pawl 44 further includes a lateral projecting pin 51 (similar to that shown at 41 for the upper gate lock 40 and which define a range of axial compression of both the gate lock and pawl relative to the shifter lever 32).

Figure 26:
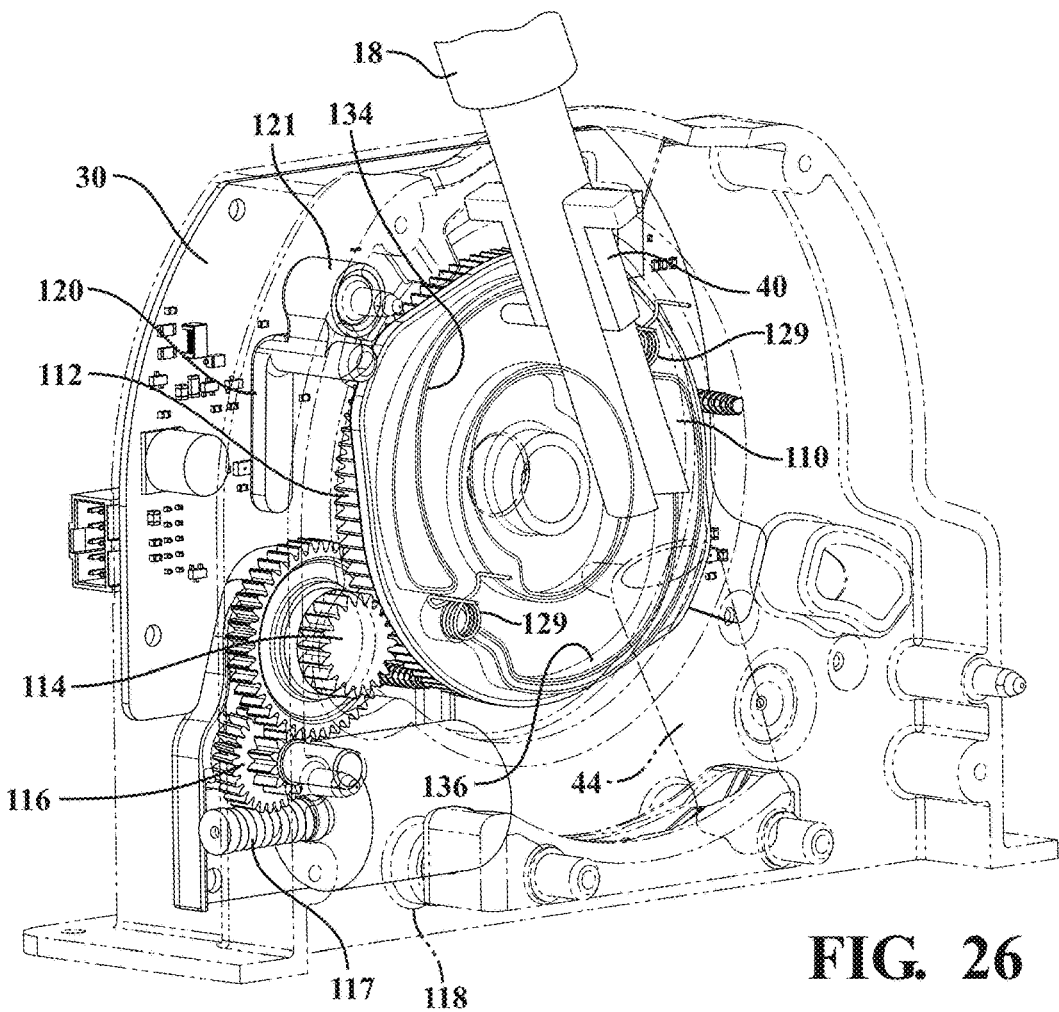
FIG. 26 is an isometric view with of the return to park cam, gate lock, pawl and return to park lever sensor in a normal operating state.

The pawl 44 projects from the slotted lower range 49 of the lower stem portion to define the desired range of biased deflection as the pawl rides along the individual haptic arc profiled defining surfaces integrated into the detent component 50 (further reference being had to FIG. 26 et seq. which further describes the functioning of the return to park cam component 110 and by which the upper gate lock 40 and lower pawl pin 51 are cooperatively actuated by the RTP cam 110 in order to retract inwardly during a command return to park condition). As will be further described, inward depressing of the shift button 39 results in retraction of the gate lock 40 from the selected underside boss with which it is engaged.

FIG. 13 is an inside plan view of the outer side cover portion 14 of the package defining housing and which depicts the plurality of bosses placed in specific gate positions. These include each of boss 52 corresponding to Park Shifter Position, boss 54 corresponding to Reverse Shifter Position, boss 56 corresponding to Neutral Shifter Position, boss 58 corresponding to Drive Shifter Position, and boss 60 corresponding to Manual Shifter Position. While depicting a standard PRNDM shifter layout (see also graphical display 154 to be subsequently described in FIG. 36), it is understood that the present invention can be adapted for use with any other shifter position or gear configurations, such as which can substitute a Sport position for the Manual position or any other desired arrangement.

As previously noted, the shift lever assembly is physically restricted by the various bosses 52-60 placed in the specific gate positions within the housing. The restrictions configured into each of the bosses are overcome by depressing the shift knob button 39 which again downwardly displaces the gate lock 40 via sliding of the stem 36 in a downward and extending direction within the upper and outer coaxial housing portion 32 and against the outward biasing force of the gate lock spring 45, which allows the gate lock 40 to clear the restrictions provided by the bosses in the housing (see FIG. 14).

Figure 15:
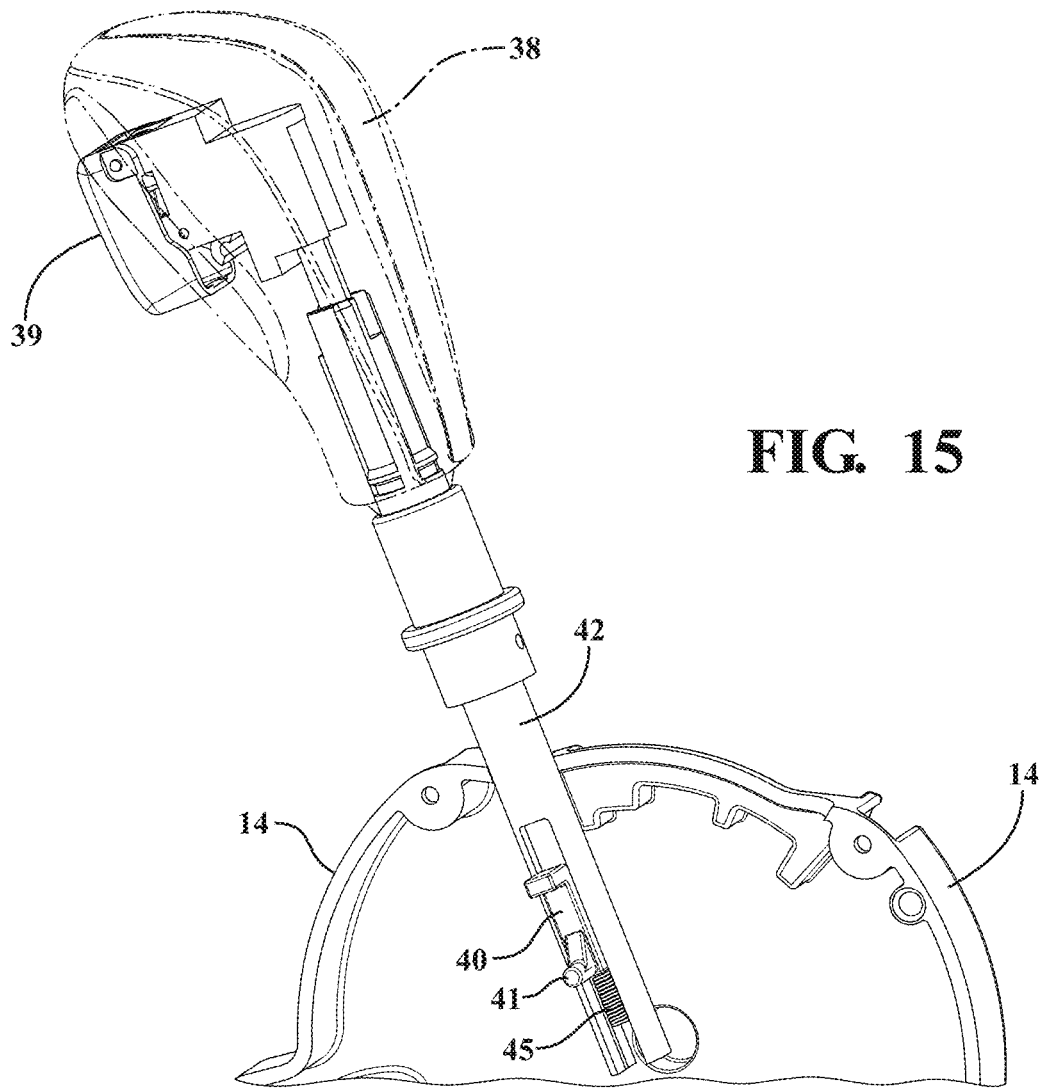
FIG. 15 is a succeeding illustration to FIG. 14 in the unlock position resulting from the push button knob being depressed to unseat the gate lock from the underside positioned boss.
Figure 16:
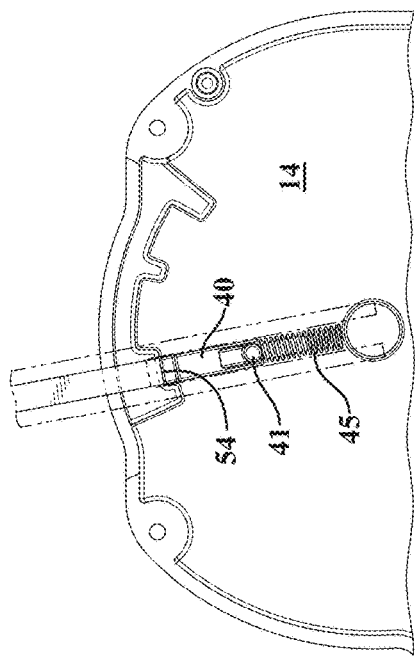
FIGS. 16-20 illustrate a succession of gate positions of the shift lever with spring loaded gate lock and corresponding to each of Park, Reverse, Neutral, Drive and Manual and further illustrating the limited range of permitted motion established between the respective gears without actuated the gate lock mechanism.
Figure 17:
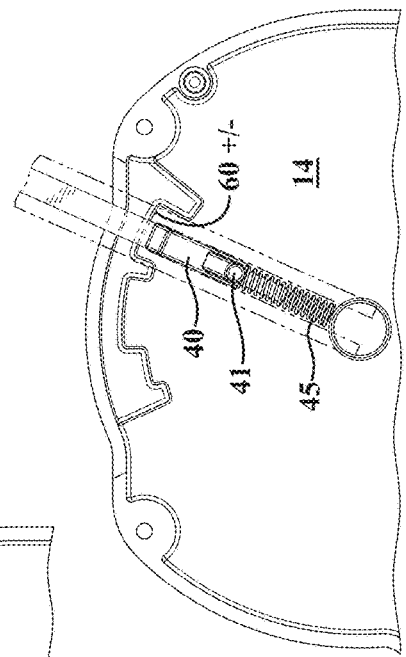
Figure 18:
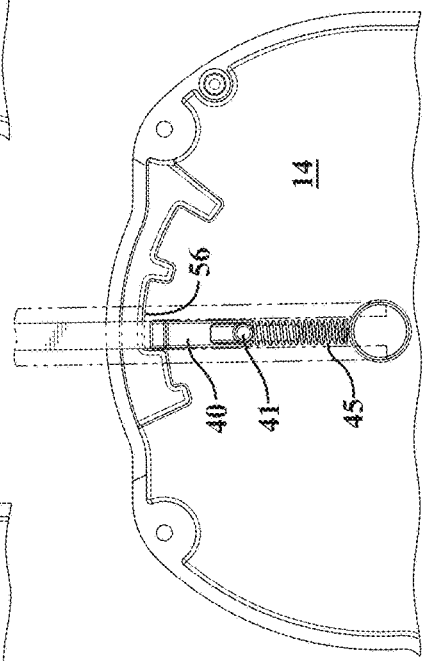
Figure 19:
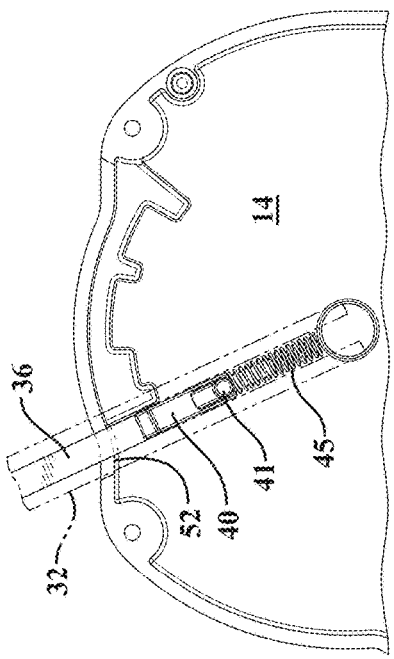
Figure 20:
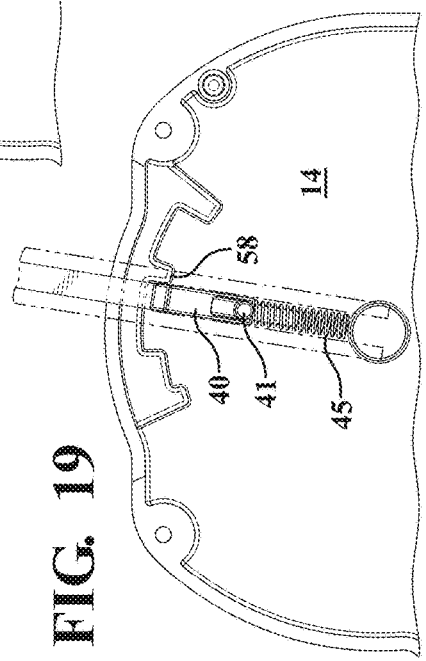

The gate lock 40 subsequently returns to the lock position upon releasing the knob shifter button 39 and the subsequent upward seating force exerted by the gate lock spring 45 (see FIG. 15). In this manner, the bosses/gates 52-60 provide restricted movements between relative shifter positions, when the gate lock 40 is engaged in the lock position. This includes movement between the Park position and Park to Reverse position (FIG. 16), Reverse to Park position (FIG. 17), Neutral to Reverse (FIG. 18), or Drive to Manual shifter positions (FIG. 19). Additional functionality includes the ability to shift from Drive to Neutral position (FIG. 19 to FIG. 18) or Neutral to Drive position (FIG. 18 to FIG. 19) and between respective plus and minus Manual positions, see at 60+/− in FIG. 20 and which can corresponding to a PCB controller instructed subset shifter menu, in each instance without actuating the gate lock 40.

Figure 21:
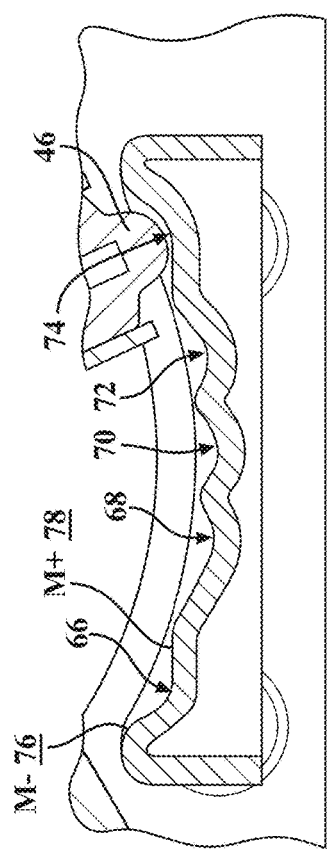
FIG. 21-23 are a series of plan and perspective views of the lower shifter lever spring loaded pawl and engaging detent plate portions which, in combination with the upper end spring loaded gate lock and underside housing bosses, facilitate lever motion through the shifter positions as reflected by reverse progression arcuate positions depicted upon the detent plate.
Figure 23:
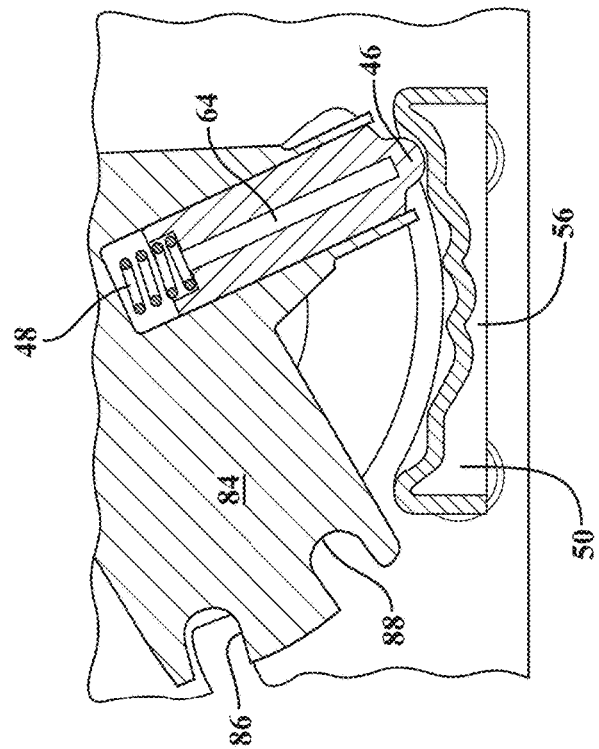
Figure 22:
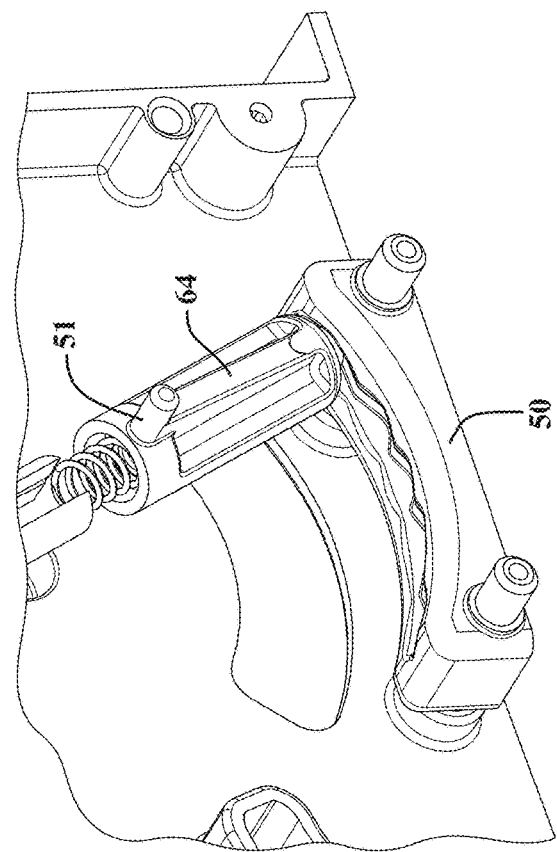

FIGS. 21-23 provide a series of plan and perspective views of the lower shifter lever spring loaded pawl 44 and engaging detent portions 50 which, in combination with the upper end spring loaded gate lock 40 and underside housing bosses 52-60 in order to facilitate lever motion through the shifter positions. The pawl 44 includes a laterally projection 51 (see FIGS. 22 and 24) the same seating within an axial slot 64 (see FIG. 3) configured within the lower outer housing portion 34 of the pivotally supported lever 18 and so that the biasing bottom rounded portion 46 is influenced downwardly by the lower spring 48 against the arcuate arrayed detent positions.

As shown in FIG. 21, the detent plate 50 provides poly-stable positions for each gear shift position, these being arranged in a reverse arcuate layout as compared to the gate lock boss defining shifter positions in FIG. 13. As shown, the detent plate 50 includes each of a Manual Position 66 (corresponding axially to boss Manual position 60 in FIG. 13), a Drive Position 68 (corresponding axially to upper underside boss 58), a Neutral position 70 (corresponding axially to underside boss 56), a Reverse position 72 (corresponding axially to boss 54) and, finally, Park position 74 (corresponding axially to boss 52).

The Manual detent position 66, as shown, further includes monostable gear functionality (see M− gear 76 and M+ gear 78 and by which subset movements of the shifter within the respective positions results in the PCB controller providing subset shifting) in combination with the underside configured boss shifter position 60. In the manual boss or mode 60, the shift lever 18 can be moved inside of its detent position by pressing or pulling the lever in either of a fore (to M+ gear) or aft (to M− gear) direction, and by which the shift lever does not leave its manual position as a result of the gating/boss configuration.

In operation, the shifter provides the poly-stable positions for each gear selection with the spring loaded pawl 44 maintaining position by its bulbous and spring biased lower end portion 46 being caused to rest within a selected valley location of the detent plate corresponding with each of the shifter positions 66-74. In this manner, the shifter provides haptic feedback when shifting between the gear positions by utilizing the spring loaded pawl 44 to travel up and down and the peaks and valleys of the detent plate 50. As the pawl 44 travels up to a selected peak defined in the arcuate upward detent plate surface, the ball pin spring 48 is compressed, which translates into a tactile increase in shift efforts felt by the operator.

Figure 2:
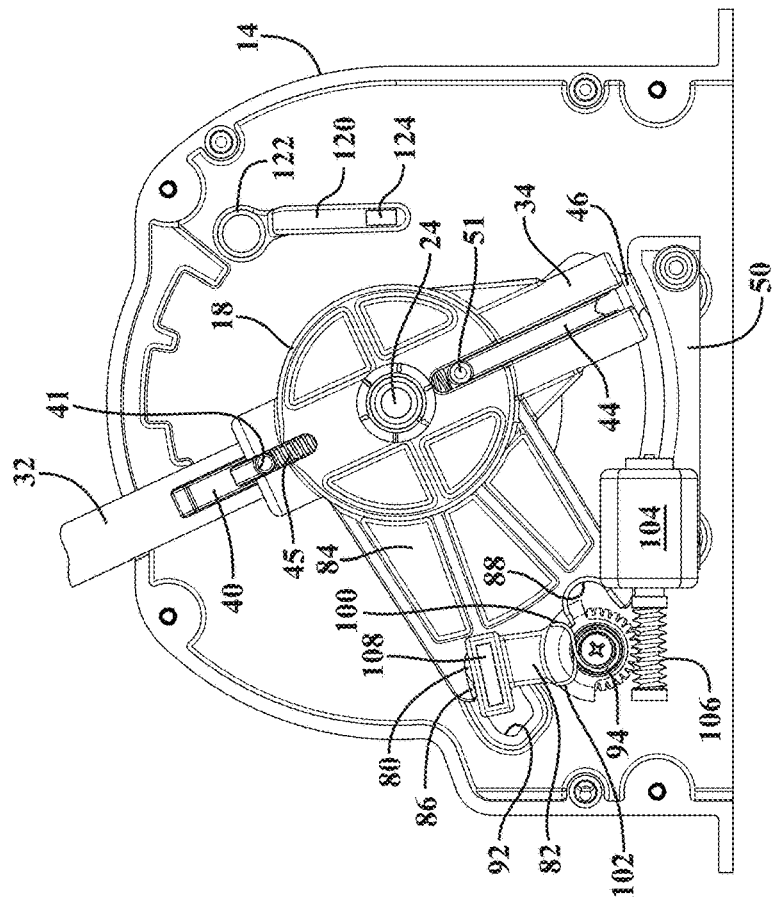
FIG. 2 is a plan view illustration of the lever assembly with parts removed and depicting the park lock lever and park lock sensor lever in the locked position.

Referring again to FIG. 1 in combination with FIGS. 2-11, a description will now be had as to the structure and functionality of the park and neutral lock functionality of the present design and which provides an operator lock function in each of the Park and Neutral shifter positions in order to prevent binding of the motorized assembly in either engaged position as well as to ensure that certain conditions are met in order for the shifter to disengaged from either of the Park or Neutral positions. FIG. 2 is a plan view illustration of the lever assembly with parts removed and depicting each of a park lock lever 80 and a park lock sensor lever 82 in the locked position. As shown, the shifter body 18 includes a further radial projection 84 in turn defining each of Park 86 and Neutral 88 recessed engaged locations, these being selectively engaged by a projection 90 of the park lock lever 80 which extends through an arcuate channel location 92 of the housing side portion 14.

In this manner, the park lock lever 80 is engaged with the shifter lever in either of the Park 86 or Neutral 88 positions, with the park lock sensor lever 82 pivotally coupled to the park lock lever via a torsion spring 94. As shown, the torsion spring 94 is mounted about a circular and toothed gear portion 96 of the park lock sensor lever 82 and includes a pair of end turned legs 100 and 102 (see FIGS. 3-4) which biases the park lock lever 80 in pivotal alignment with the park lock sensor lever 82.

A secondary motor 104 is incorporated into the housing and has a powered worm gear 106, the rotation of which inter-engages with the circumferential end teeth of the toothed gear portion 98 for actuating the park lock sensor lever 82, with the torsion spring 94 thereby transferring the rotation of the park lock sensor lever 82 to the park lock lever 80. Also depicted is a park lock magnet 108 incorporated into the park lock sensor lever 82 for providing feedback to a further sensor located on the PCB board 30 (see as best shown in FIG. 1) for indicating whether the park lock sensor lever 82 has achieved a desired position.

Figure 5:
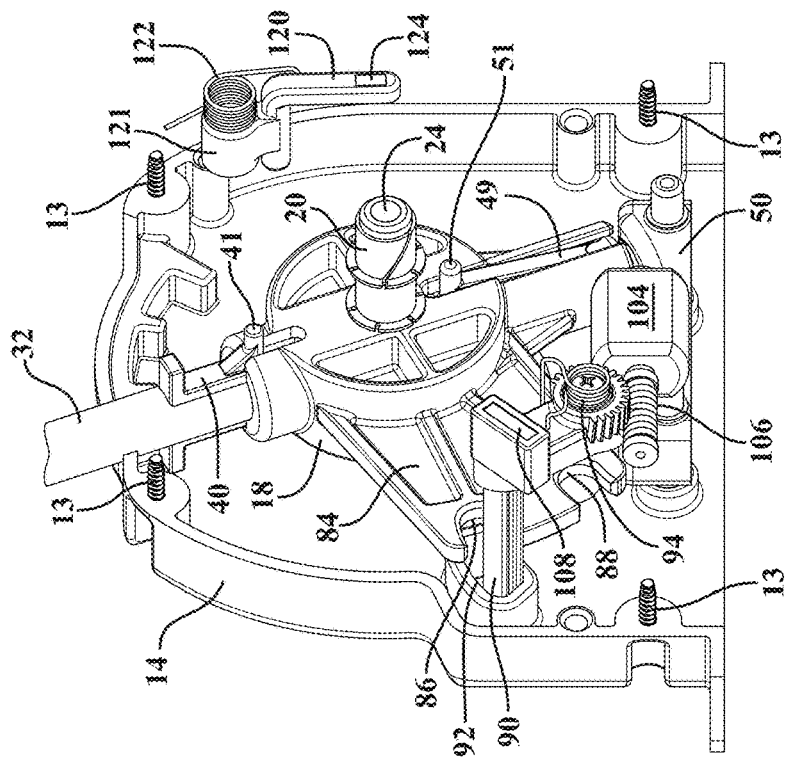
FIG. 5 is a partially rotated and perspective view of FIG. 4 and depicting the unlocked position of the park lock lever and sensor lever.
Figure 4:
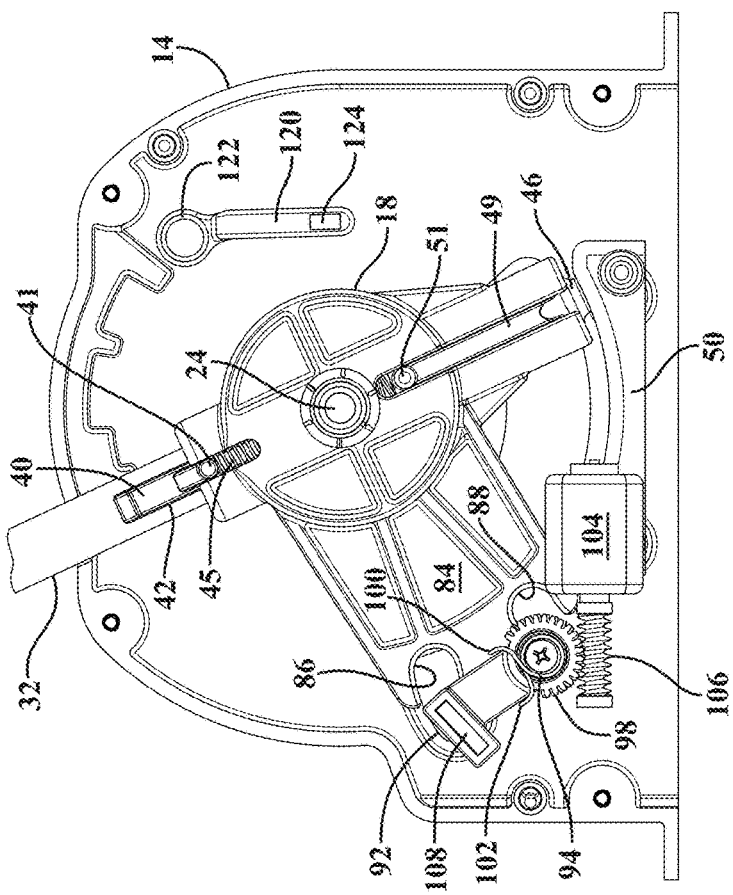
FIG. 4 is a corresponding illustration to FIG. 2 and depicting the park lock lever and park lock sensor lever in the unlocked position.
Figure 9:
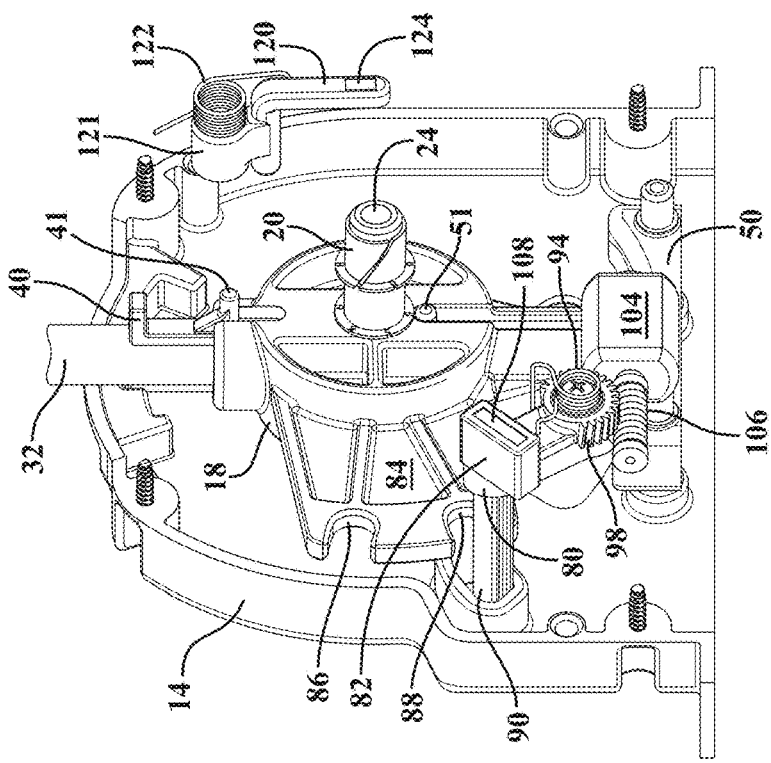
FIGS. 8 and 9 are a pair of plan and partially rotated perspective view of the lever assembly in the neutral unlocked position.
Figure 8:
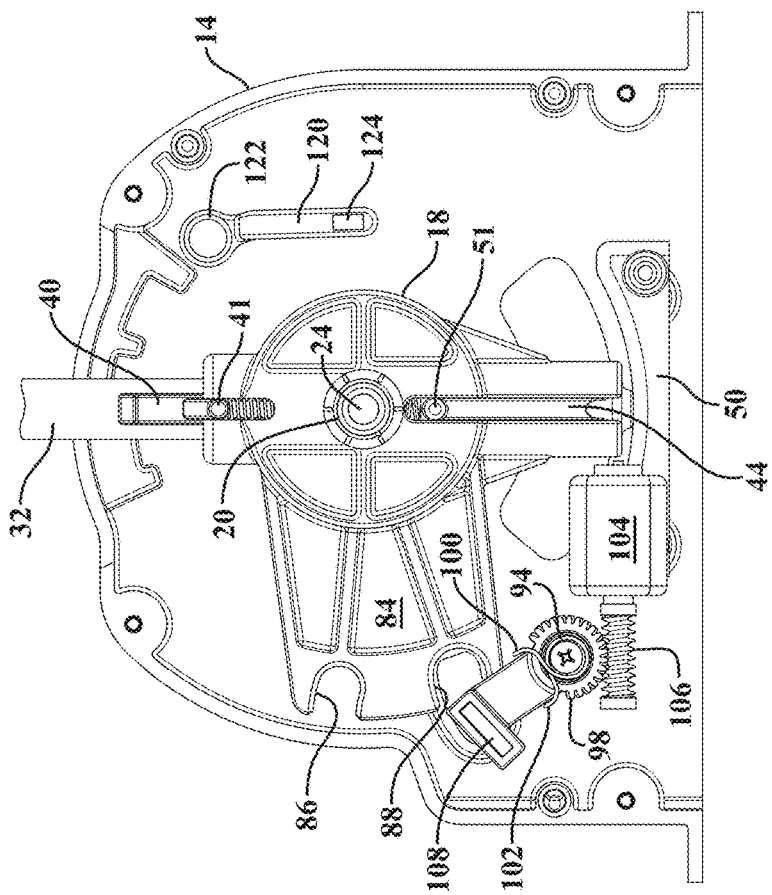

A decoupling feature prevents binding of the park lock lever 80 and by which a binding condition of the lever 80 results in permitted rotation of the park lock sensor lever 82 in such as an unlock direction (see FIGS. 4-5 from Park lock condition and FIGS. 8-9 from Neutral lock condition). This occurs such as upon clearing of an obstruction to the park lock lever 80, and which can occur as a result of an existing pre-load or interference with respect to the engaged condition of the park lock lever projection 90 within either of the Park 86 or Neutral 88 shifter positions, such being reduced below a level of force being exerted by the park lock torsion spring 94, whereupon the spring overcomes the preload/ interference for resetting the mechanism to re-sync the park lock lever 80 and park lock sensor lever 82 to prevent the worm gear 106 and park lock sensor lever gear 98 from binding due to overload. As further depicted, a first of the interiors defined between the central support structure 12 and selected side attachable cover 14 supports the shifter lever 12, with the other of the defined interiors between the central support structure 12 and the other side attachable cover 16 supporting the park lock lever 80, park lock sensor lever 82, motor 104 and PCB board 30.

Figure 3:
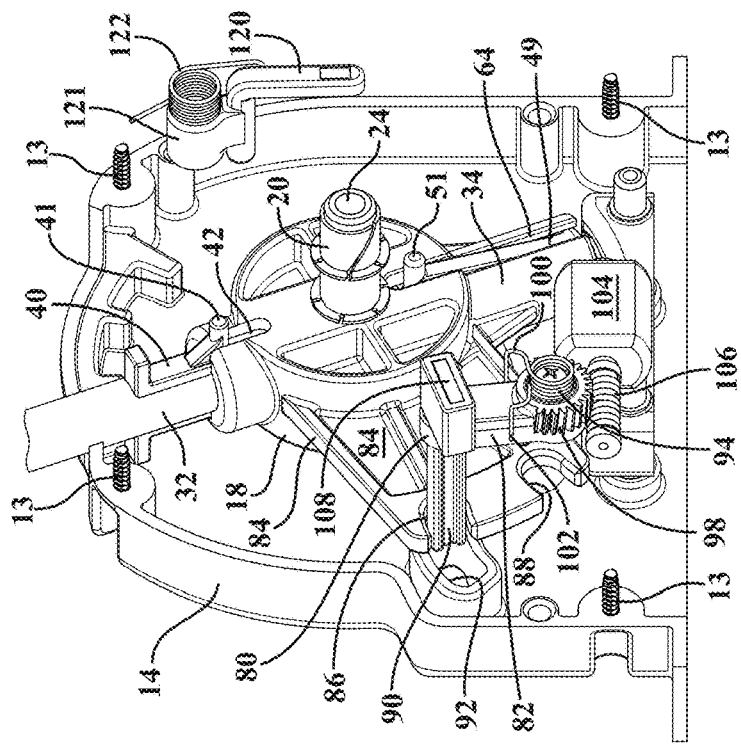
FIG. 3 is a partially rotated and perspective view of FIG. 2 in the locked position and depicting relationship of the ASM Motor with powered worm gear for actuating the park lock sensor lever, with the torsion spring transferring the rotation of the park lock sensor lever to the park lock lever, the park lock magnet supported on the park lock sensor lever further serving as a feedback to a sensor on the circuit board for indicating whether the park lock sensor lever has achieved the desired position, whether locked or unlocked.

Referencing FIG. 3, a partially rotated and perspective view of FIG. 2 is provided in the locked position and depicting relationship of the ASM Motor (again at 104) with the powered worm gear 106 for actuating the park lock sensor lever 82 via its circular shaped and lower end located sensor lever gear 98, with the torsion spring 94 transferring the rotation of the park lock sensor lever 82 to the park lock lever 80 and the park lock magnet 108 supported on the park lock sensor lever further serving as a feedback to the PCB board 30 mounted sensor for indicating whether the park lock sensor lever 82 has achieved the desired position, i.e. such occurring whether locked or unlocked. A subset cover portion 109 is shown in FIG. 1 for securing the ASM motor 104 as well as the park lock lever 80, sensor lever 82, and torsion spring 94 in pivotally supported fashion within an associated pivotal support location defined within the main support structure 12

FIG. 4 is a corresponding illustration to FIG. 2 and depicting the park lock lever 80 and park lock sensor lever 82 in the unlocked position, such resulting from the energizing of the motor 104 in order to rotate the park lock sensor lever from the locked position of FIGS. 2-3, in which the rotation of the sensor lever 82 is transferred to the park lock lever 80 via the influence of the torsion spring 94. As indicated, the park lock magnet 108 serves as a feedback to the sensor (not shown) on the PCB board 30 to indicate that the park lock sensor lever 82 has achieved the desired position (locked or unlocked).

Figure 7:
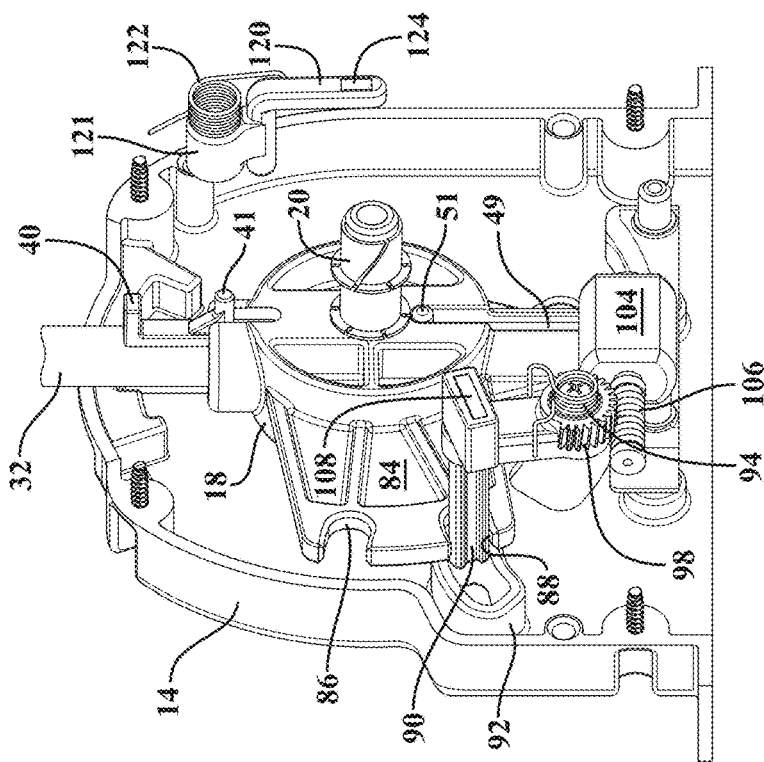
FIGS. 6 and 7 are pair of plan and partially rotated perspective views of the lever assembly in the neutral locked position.
Figure 6:
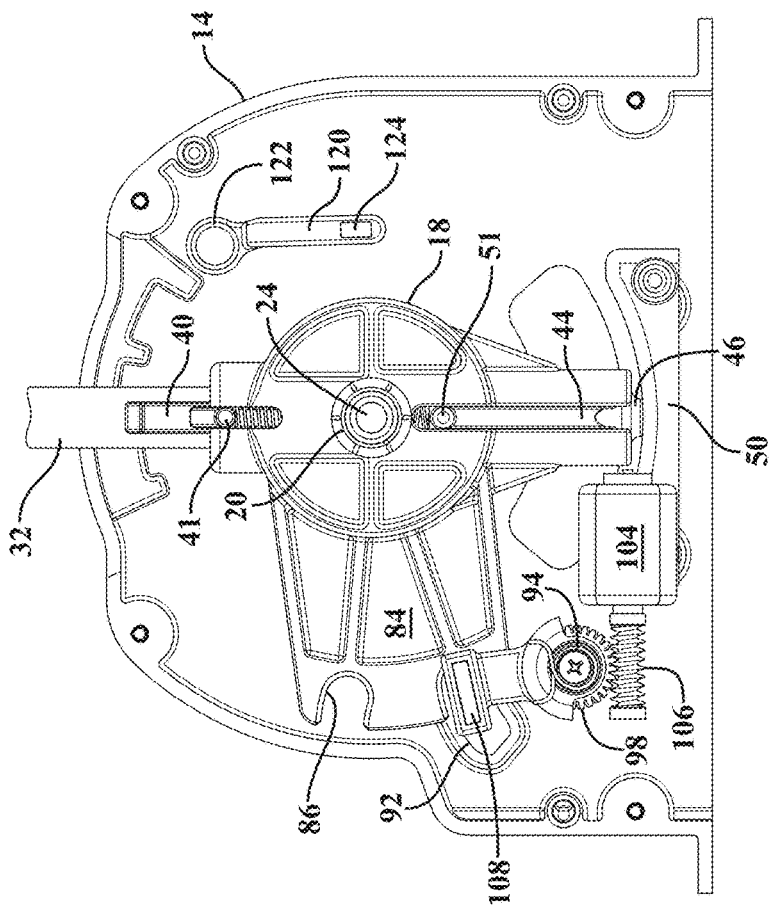

FIG. 5 is a partially rotated and perspective view of FIG. 4 and depicting the unlocked position of the park lock lever 80 and sensor lever 82, with FIGS. 6 and 7 presenting a pair of plan and partially rotated perspective views of the lever assembly in the neutral locked position (e.g. the projecting portion 90 of the park lock lever 80 extending through arcuate channels 92 which can be configured into each of the central housing structure 12 (see also FIG. 1) as well as side attached cover 14, and with the lever portion 90 engaged to the Neutral shift location 88.

Figure 10:
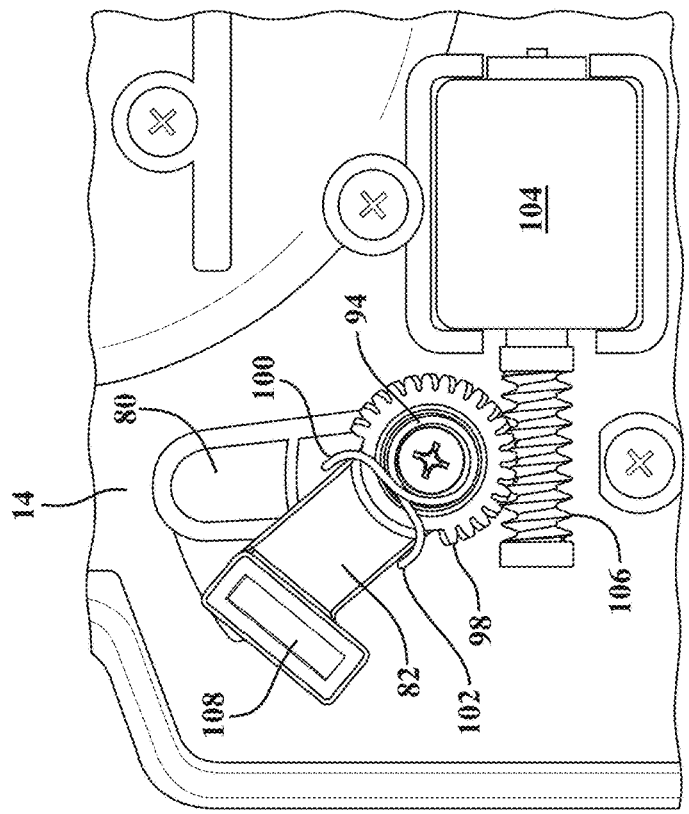
FIG. 10 is a first plan view illustration of a decoupling feature associated with the lever assembly for preventing binding and by which a binding condition of the park lock lever results in permitted rotation of the park lock sensor lever in either of the lock or unlock directions.

FIGS. 8 and 9 present a pair of plan and partially rotated perspective view of the lever assembly in the neutral unlocked position. FIG. 10 presents a first plan view illustration better indicating the functionality of the decoupling feature associated with the lever assembly for preventing binding, and by which a binding condition of the park lock lever 80 results in permitted rotation of the park lock sensor lever 82 in either of the clockwise (cw) locking or counter clockwise (ccw) unlocking directions.

Figure 11:
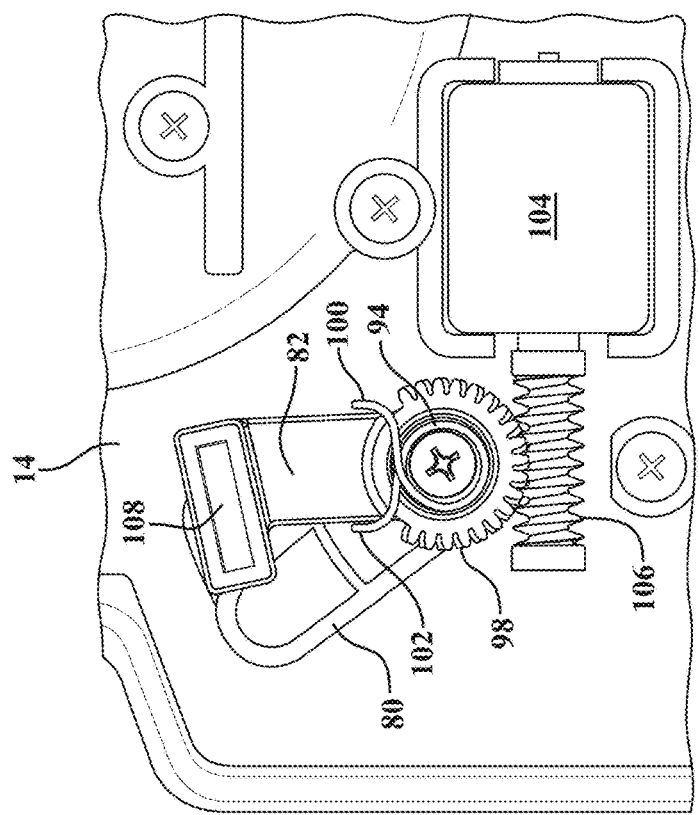
FIG. 11 is a succeeding plan view to FIG. 10 illustrating the decoupling which occurs as a result of binding during the lock command and by which the present anti-binding system prevents binding by permitting independent pivoting of the park lock sensor in either direction (lock or unlock directions) and further which, upon clearing of the obstruction to the park lock lever (such as by the pre-load or interference being reduced below a level of force being exerted by the park lock torsion spring) the spring is caused to overcome the preload/interference for resetting the mechanism to re-sync the park lock lever and park lock sensor lever to prevent the gear system from binding due to overload.

FIG. 11 is a succeeding plan view to FIG. 10 illustrating the decoupling which occurs as a result of binding during the lock command and by which the present anti-binding system prevents binding by permitting independent pivoting of the park lock sensor 82 in either direction (lock or unlock directions). As is further understood, and upon clearing of the obstruction to the park lock lever 80 (such as by the pre-load or interference being reduced below a level of force being exerted by the park lock torsion spring) the spring 94 is caused to overcome the preload/interference for resetting the mechanism to re-sync the park lock lever 80 and park lock sensor lever 82 to prevent the gear system from binding due to overload.

With reference to FIGS. 11A-11D, presented are a series of perspective, plan, exploded and section views of an alternate variant of anti-binding mechanism in comparison to that shown in FIGS. 10-11 and by which the park lock lever and sensor lever are combined into a single piece redesigned lock arm component 81. As shown in the perspective view of FIG. 11A and corresponding exploded view of FIG. 11C, the meshing gear (again as previously shown and described at 98) is rotatably supported between a pair of spaced apart ears or lobes 83 and 85 configured in the redesigned lock arm component 81 and at an end opposite a redesigned lever portion 87.

As best shown in FIG. 11C, the torsional spring previously shown at 94 is replaced by a friction locking spring washers (this as shown in one non-limiting configuration including a pair of washers 89 and 91 provided in combination with a spring washer or like component 93). The washers or spring washers are arranged against opposite faces of the gear 98 and which, upon the torque exerted upon the lock arm 81 exceeding the torque prescribed to the friction (such associated a bind condition existing between the cross-helical gears 98 and 106), the lock arm supported wheel gear 98 is permitted to slip within the device to prevent the gear system from binding due to overload. FIG. 11D presents a plan cutaway of the alternate one piece combination lock arm component 81 and references a rotary support spindle 95 which rotatably supports the gear wheel 98 along with the pair of washers 89/91 and the spring washer 93.

As previously described, and in instances in which a corresponding gear 98 is fixed to a lock arm (i.e. not rotatable relative thereto under any torque loading), conditions such as obstruction, pre-load or impact due to uncontrolled motion of the lock arm may cause loads on the gear assembly resulting in the lever gear and corresponding motor worm gear 106 binding. In order to prevent this, the present anti-bind mechanism is designed to allow the gear 98 supported upon the combination lock/sensor lever arm 81 to rotate inside of the arm 81 to prevent such a bind condition. This is assisted due to the friction established between the lock arm 81 and the gear 98, the source and magnitude of which again resulting from the pre-load of the arrangement of the spring washer(s) 93 between the lock arm and gear.

In the illustrated embodiment, a pair of conventional style washers, again at 89/91, are provided in combination with the spring washer 93, in order to provide consistent contact surfaces and to minimize wear, such as where the parts would rub upon relative rotation/slippage of the gear 98 relative to the redesigned lock arm 81. In this manner, and in instances where a binding condition occurs by which the torque to move the lock arm is greater than the torque provided by the prescribed frictional engagement established between the gear wheel 98 and redesigned lock arm 81, the gear 98 will then be allowed to slip or rotate, thereby relieving the binding condition.

Figure 24:
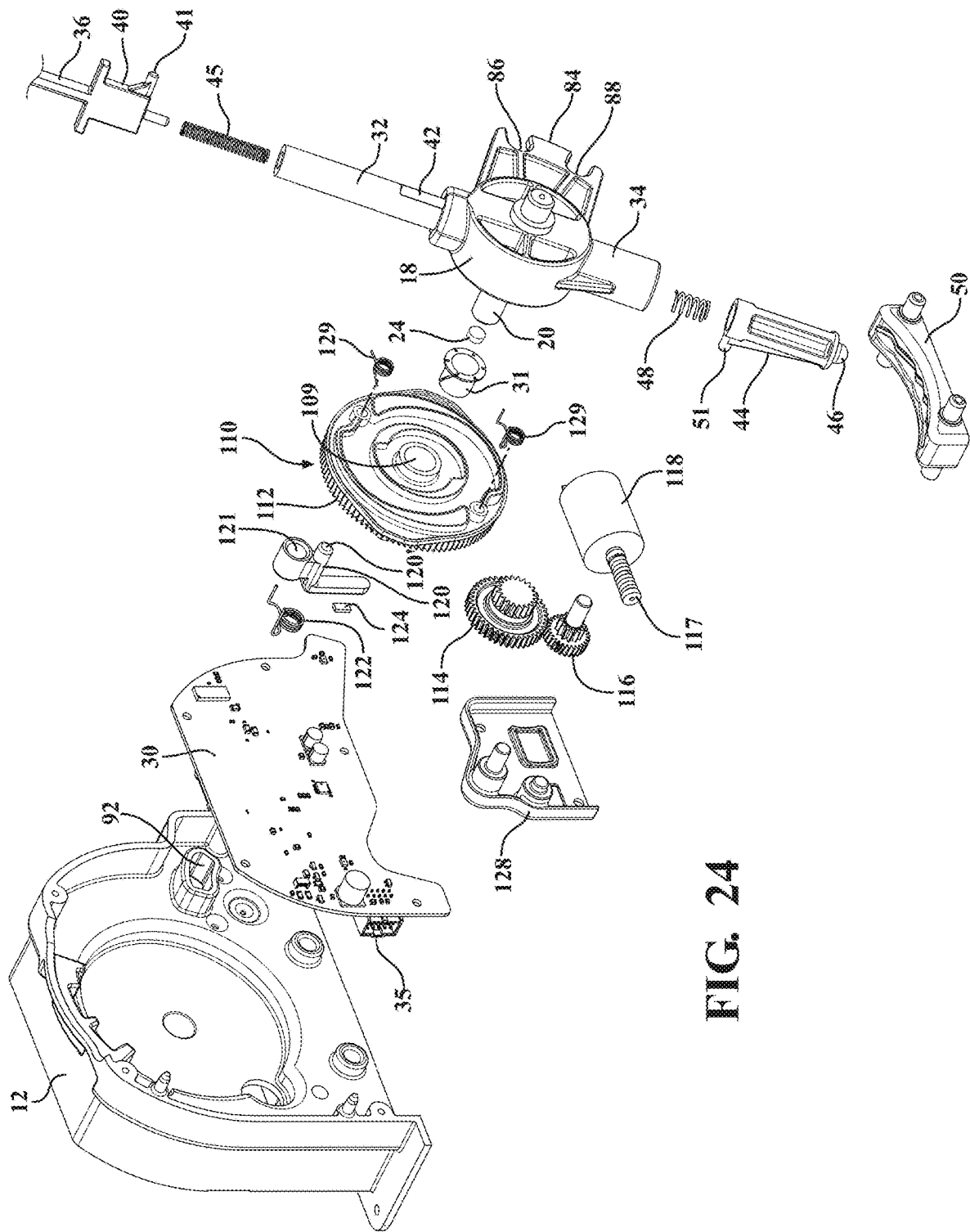
FIG. 24 is an exploded perspective view of the return to park components of the lever shifter assembly as compared to the overall exploded perspective of FIG. 1.

With reference again to FIG. 1, and further to the exploded perspective of FIG. 24, an explanation will now be had as to the return to park (RTP) functionality for rewinding the shift lever 18 back to the Park position. This occurs such as in response to the PCB 30 receiving an external signal necessitating resetting of the shifter, typically sent to the PCB board 30 via an external sensor which identifies a condition requiring that the vehicle be placed back into the Park position.

With reference also to succeeding FIGS. 25-33, structural components associated with the RTP function again references the rotating cam component 110, this having a central shaft location 109 (FIG. 24) for seating the center axis projection 20 of the shifter 18, and including an interposed sleeve bearing (again at 31 as also referenced in FIG. 1) The cam 110 exhibits an exterior toothed profile 112 operable by an output gear (also termed a stacked spur gear 114 in turn driven by a stacked gear 116 and inter-rotating worm drive gear 117 of a return to park motor 118 (this distinct from the Park/Neutral unlock motor 104). Actuation of the motor and gearing occurs in a given rotational direction in order to successively retract the shifter lever 18 (via rotation of the cam RTP component 110 causing retraction of the lever gate 40 from any boss defining shifter position and without an operator having to depress the shifter button or trigger 39), such further occurring from any non-Park shifter position in which the shifter lever is then pivotally rotated in a return direction to the Park position.

Figure 33:
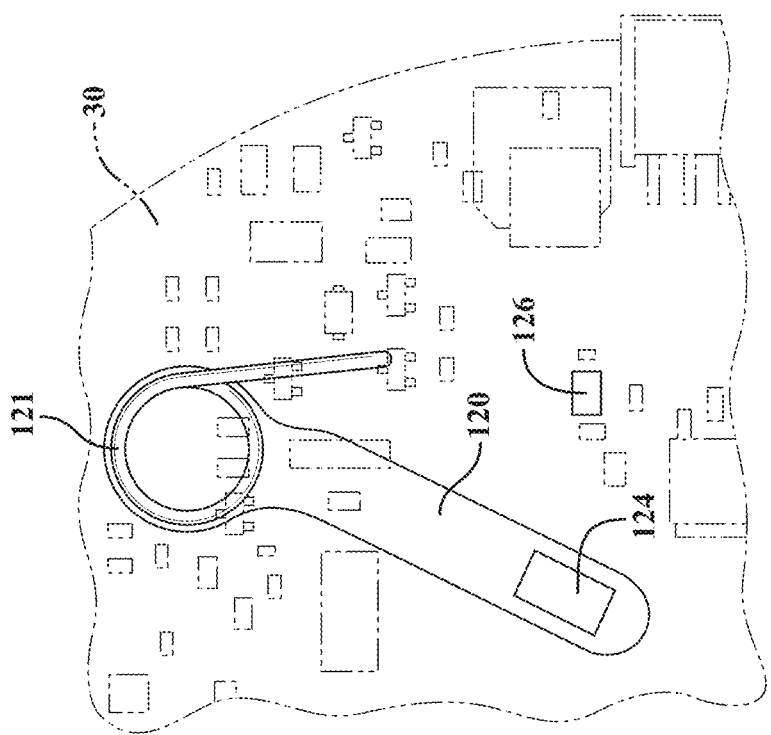
FIG. 33 is a succeeding view of FIG. 32 depicting the bracket RTP sensor not in alignment with the circuit board sensor associated with a return to park position.
Figure 32:
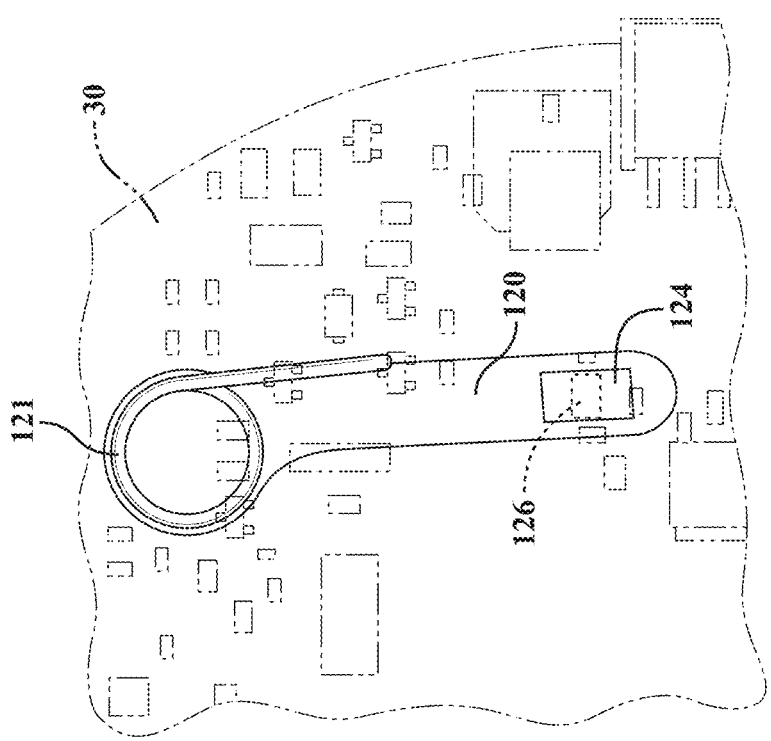
FIG. 32 is an enlarged sectional view of the bracket RTP sensor in alignment with the circuit board sensor associated with an operating position.

Also provided is a bracket 120 with sensor 120' rotatably supported upon the main housing 12 and including a sensor spring 122 (see also FIG. 1) for biasing the bracket sensor, the bracket 120 further containing a sensor magnet 124 (see FIGS. 32-33). The bracket sensor 120 is rotatably mounted via a collared location 121 and, in response to pivoting of the cam component 110 as further described, displaces relative to the PCB 30 and a further proximately positioned sensor 126 (again FIGS. 32-33) to signify achieving of the return to park (RTP) condition of the shifter lever to deactivate the motor 118.

FIG. 24 also references a return to park motor cover 128 for securing the gearing components and so that the stacked spur gear 114 is supported in meshing arrangement with both the rotating worm gear 117 of the motor 118 (via stacked gear 116) as well as the external circumferential teeth 112 of the rotatable cam 110. Additionally shown are one or more return to park torsional cam biasing springs (see at 129), these being mounted to the RTP cam 110 and including extending legs in contact with the lever supported gate lock 40 for assisting in influencing the lever back to the Park position once the upper shift lever gate 40 and lower pawl pin 51 are cooperatively retracted. As will be further described in the alternate variant of the return to park assembly in FIGS. 37-44 with redesigned RTP cam, the springs 129 need not be present in order to effectuate return shifting of the lever to the Park position.

Figure 25:
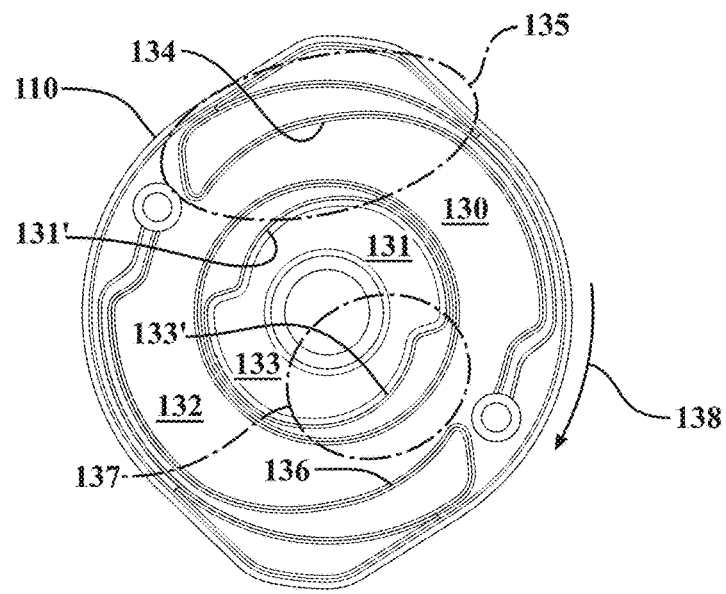
FIG. 25 is a plan view illustration of the return to park cam component exhibiting sloping surfaces which, upon rotation, concurrently retract the upper spring loaded gate lock and lower spring loaded detent plate engaging pawl.

FIG. 25 is a plan view illustration of the return to park cam component exhibiting these sloping surfaces and which, upon rotation, concurrently retract the upper spring loaded gate lock 40 and lower spring loaded detent plate engaging pawl 44. As depicted in FIG. 25, the cam component 110 exhibits a pair of semi-circular inner circumferential extending tracks 130 and 132 which define sloping surfaces for seating and retracting each of the upper gate lock 40. A further pair of inwardly positioned cam surfaces are depicted at 131 and 133 are likewise providing and include a similar sloping arrangement (see at 131' and 133') as provided for the outer coaxial positioned semi-circumferential tracks 130/132 for similarly retracting the lower pawl 44 component, both these again being spring loaded within the shifter lever 18.

The outer radial defined and semi-circular shaped tracks 130 and 132 respectively include a sloping outer wall, this shown by wall 134 for track 130 and by wall 136 for track 132 and, upon rotation of the cam 110 in a clockwise direction (via arrow 138) coacts against the upper gate lock 40 to provide the desired retracting motion. Likewise, the inner radial defined tracks 131 and 133 likewise are configured by the associated sloping walls 131' and 133' for concurrently actuating the lower pawl 44. As further depicted, upper oval representation 135 generally defines the gate lock retraction area, with additional lower oval representation 137 associated with the lower pawl retraction area. Without limitation, the profiles of the RTP cam 110 are such that it rotates in a given direction to a range of up to 180 degrees, this so that the cam continues to rotate until the vehicle has returned to the Park position.

Figure 27:
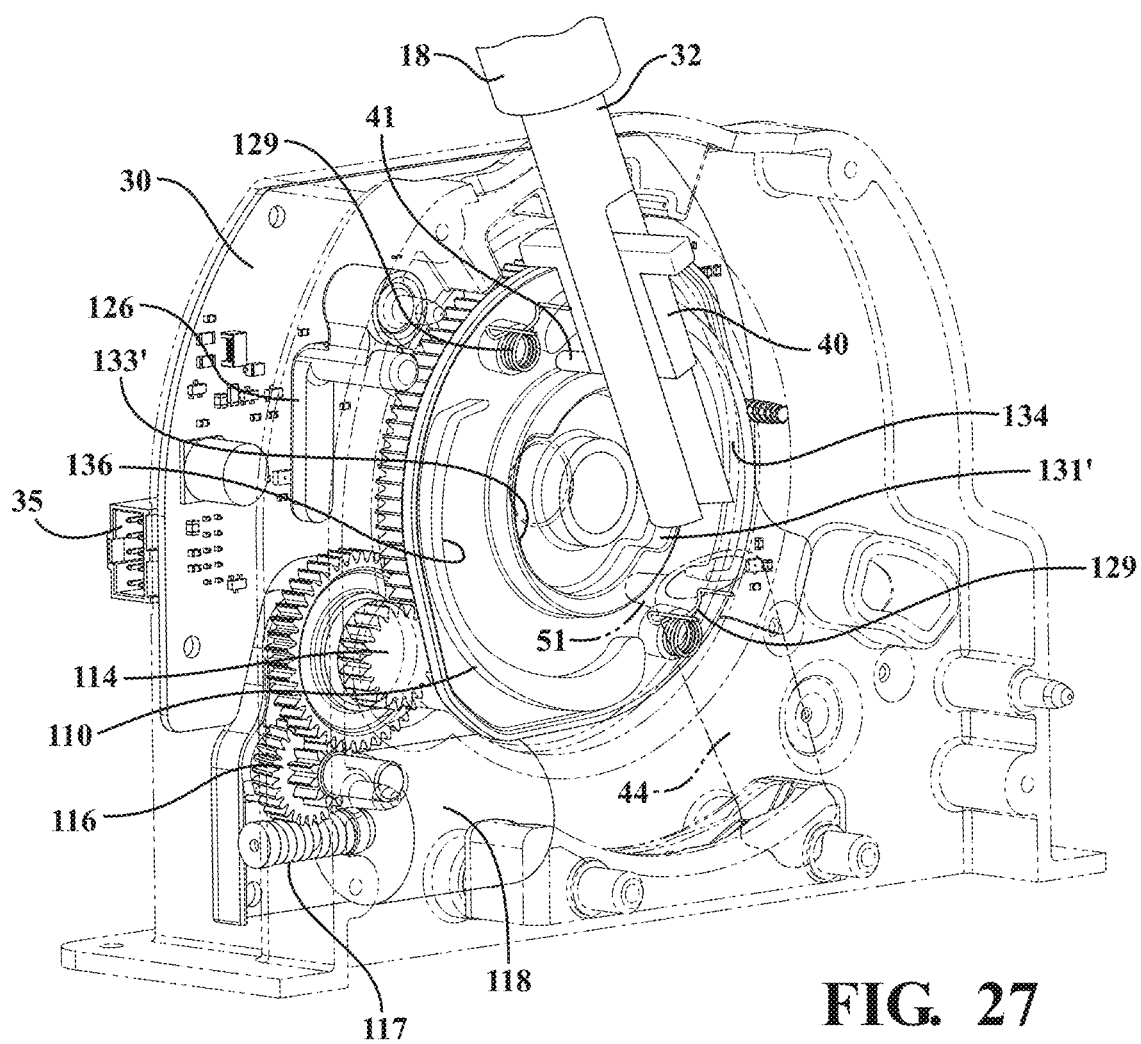
FIG. 27 is a further isometric view of the components in FIG. 26 in a retracted and return to park state.

FIG. 26 is an isometric view with of the return to park cam 110, gate lock 40, pawl 46 and return to park lever sensor 82 in a normal operating state. FIG. 27 provides a further isometric view of the components in FIG. 26, corresponding to a ccw directed actuation of the RTP cam 110 to a retracted and return to park state corresponding to the clockwise directed rotation of the cam 110 and the gradual inward displacement of the spring biased upper gate 40 and lower spring biased pawl 44 (via the coaxially arranged pairs of support surfaces 134/136 defining the upper gate track and inner 131/133 sloping surfaces defining the inner supported pawl track respectively of the RTP cam 110).

Figure 28:
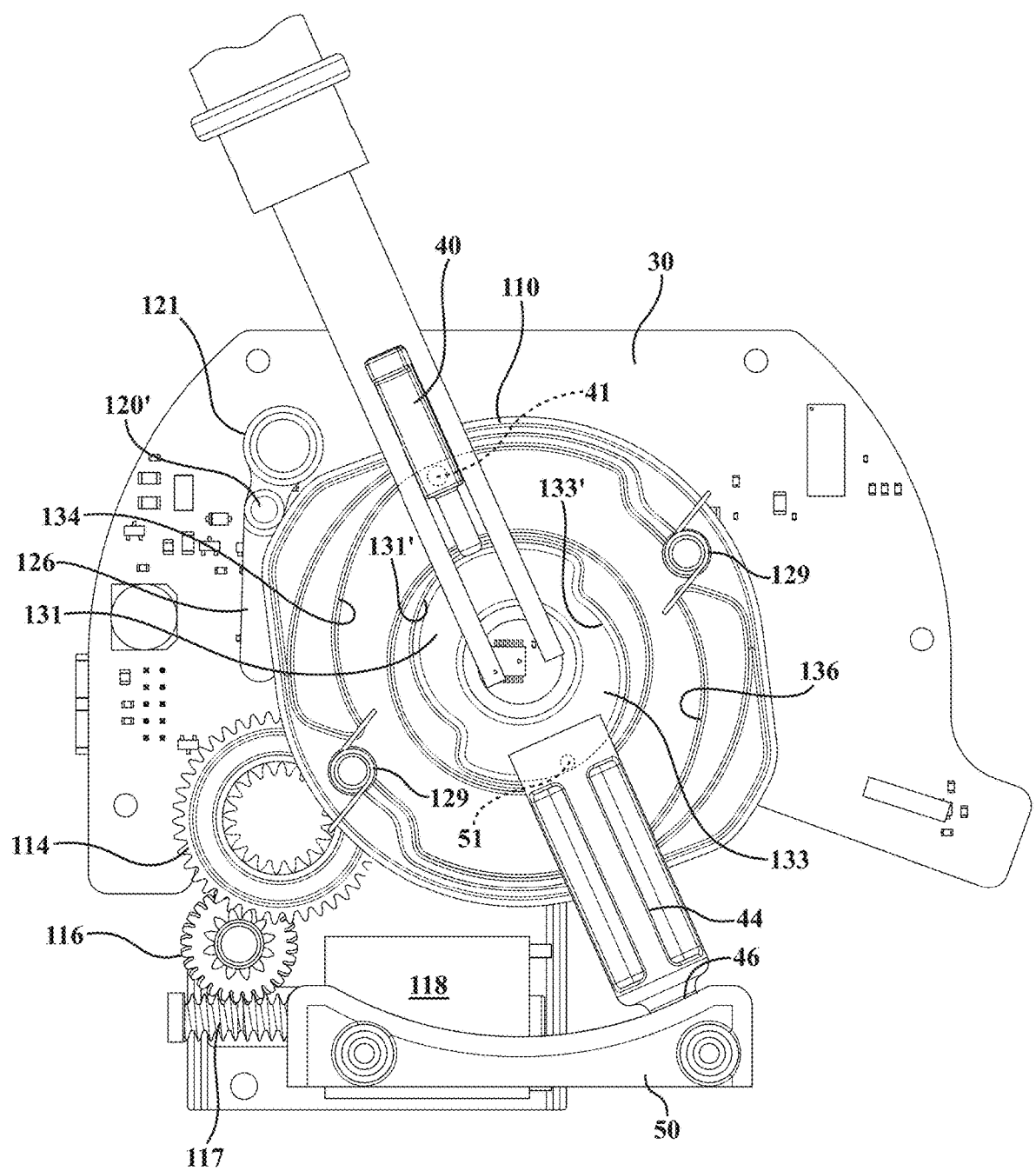
FIG. 28 is an enlarged plan view of the assembly with the gate lock in an operating position not in contact with the RTP cam, with the pawl in an operating position not in contact with the cam and the bracket RTP sensor in aligning with the circuit board sensor.

FIG. 28 is an enlarged plan view of the assembly with the gate lock 40 in an operating position not in contact (i.e. influenced by) the RTP cam 110. In this position, the pawl 44 is in an operating position in which its projecting pin portion 51 is located in a proximate and non-actuated fashion relative to the inner extending walls 131'/133' of the cam 110 and, finally the bracket RTP sensor 120' and supported magnet 124 are in alignment with the circuit board sensor 126 (again FIG. 32).

Figure 29:
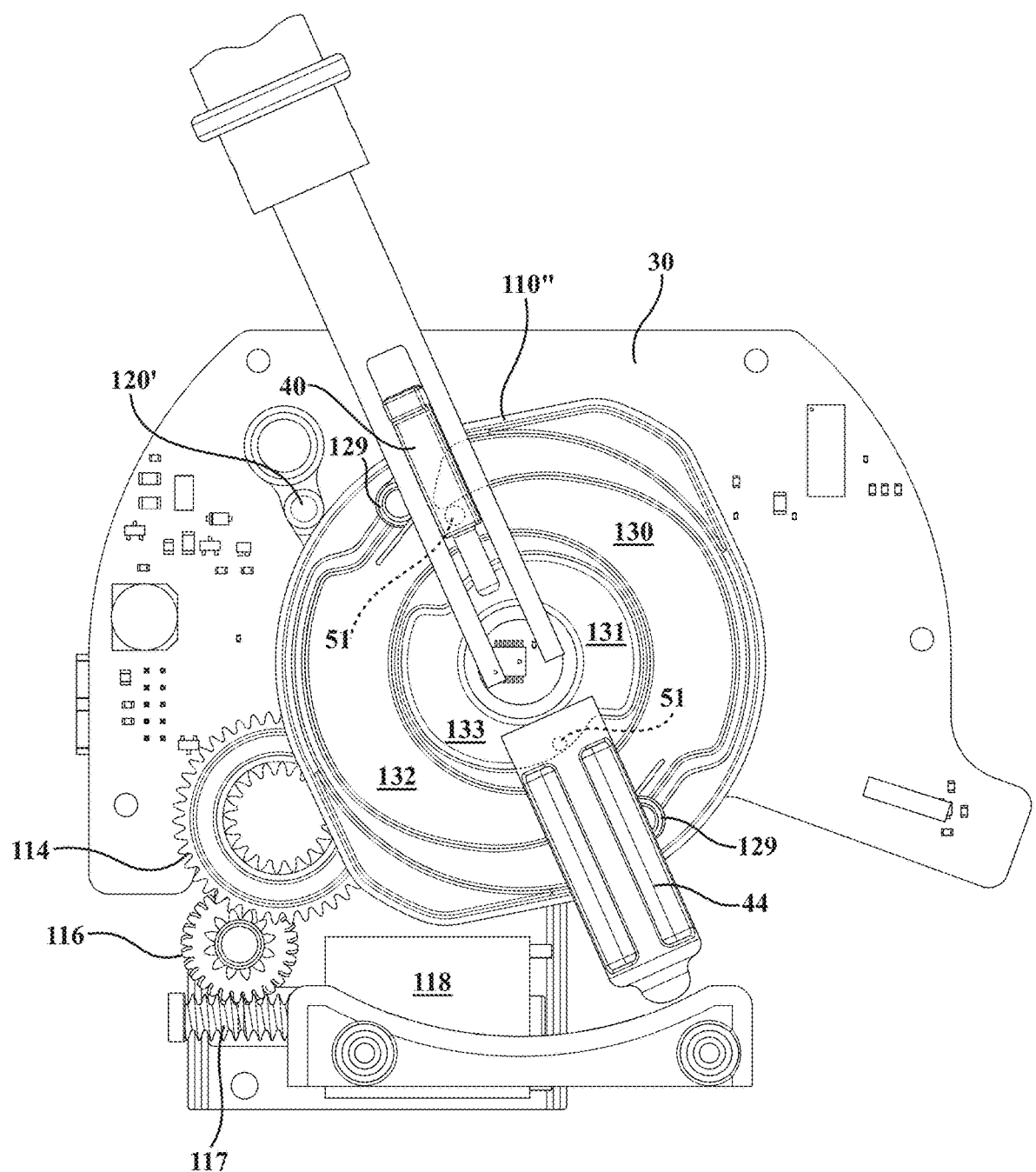
FIG. 29 is a succeeding view to FIG. 28 depicting the pawl and gate lock in the retracted position with the gate lock in contact with the RTP cam and in a compressed state, the pawl likewise in contact with the RTP cam and in a compressed stated, and the bracket RTP sensor not in alignment with the circuit board sensor.

FIG. 29 is a succeeding view to FIG. 28 depicting the pawl 44 and gate lock 40 in the retracted position, with the gate lock in contact with the RTP cam 110 (i.e. restricted by inwardly sloping wall 134) and in a compressed state, the pawl 44 likewise in contact with the RTP cam 110 (via inwardly sloping wall 133) and likewise in a compressed stated. This further results in the bracket RTP sensor 120 being pivoted about its collar out of alignment with the circuit board sensor 126 (see FIG. 33), and owing to a spring actuated position of the RTP sensor 120', resulting from rotation of the sensor bracket 120 out of engagement via contact with a circumferential ledge location (at 110") of the cam 110, thereby permitting the associated torsion spring 122 to rotate the RTP sensor along a subsequent clockwise directed receding profile of the outer cam surface.

Figure 30:
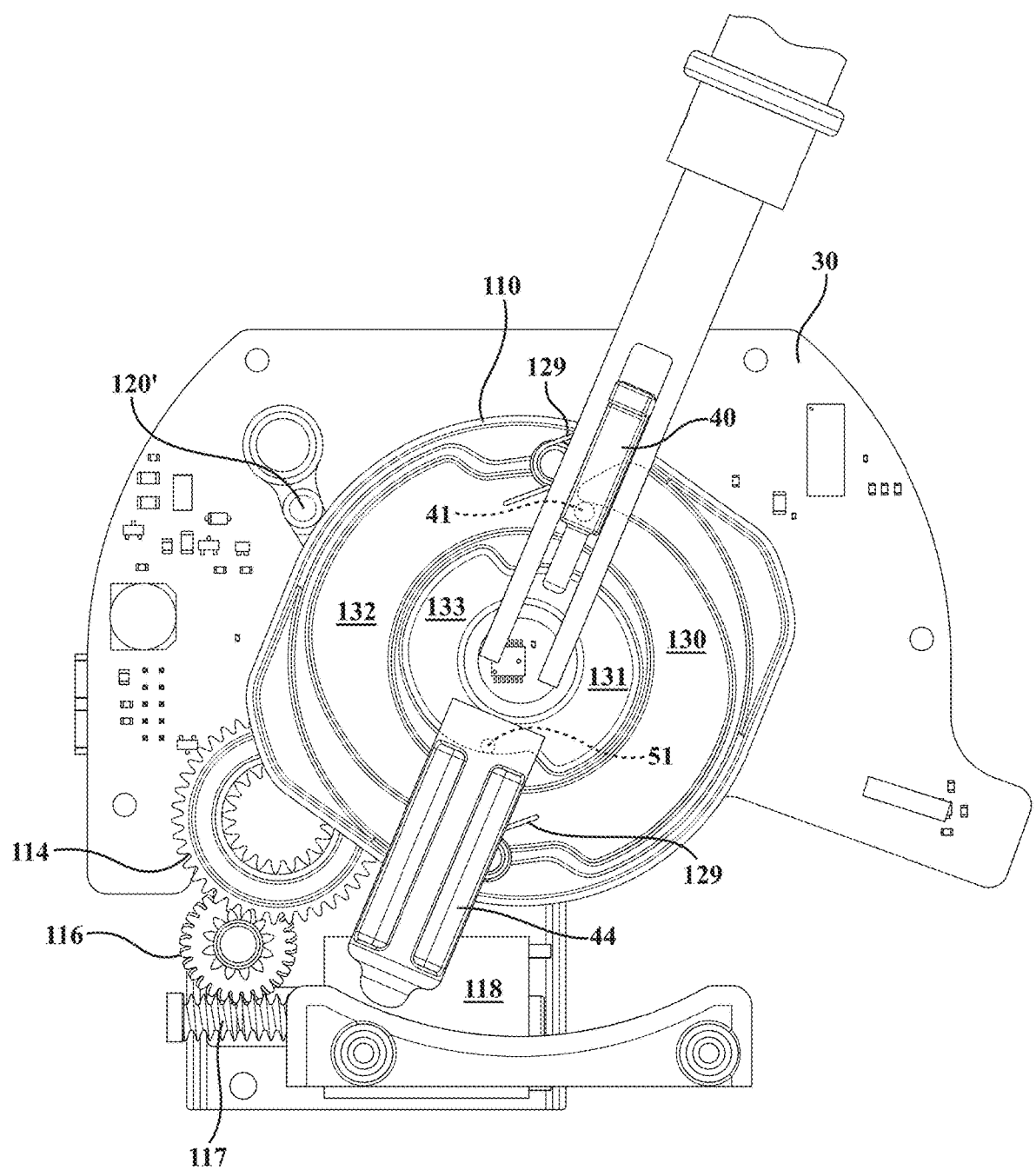
FIG. 30 is a further succeeding view depicting the pawl and gate lock in the retracted position for returning the shift lever to the park position, the gate lock and pawl remaining in contact with the RTP cam in a compressed state and the bracket RTP sensor positioned out of alignment with the circuit board sensor, at which point the RTP torsion spring is in contact with the gate lock for pulling the lever to the park position.

FIG. 30 is a further succeeding view depicting the pawl 44 and gate lock 40 in the retracted position for returning the shift lever 18 to the park position, the gate lock and pawl remaining in contact with the RTP cam 110 in a compressed state and the bracket RTP sensor 120 being positioned out of alignment with the circuit board sensor 126, at which point the RTP torsion springs 129 is in contact with the gate lock for pulling the lever 18 to the park position.

Figure 31:
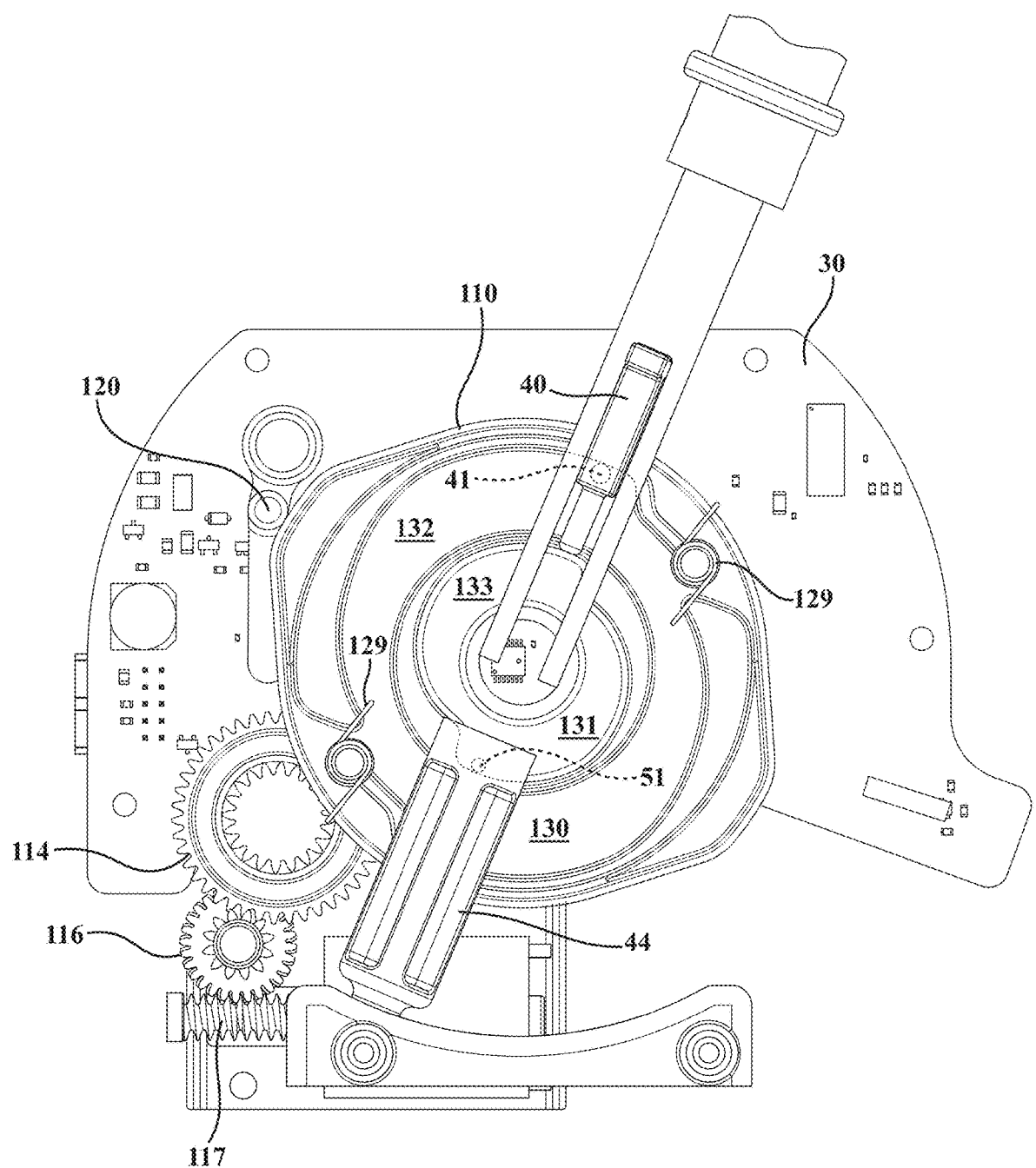
FIG. 31 a further succeeding view depicting the lever in the returned to park position in which the gate lock and pawl are returned to the operating position not in contact with the return to park (RTP) cam and with the bracket RTP sensor in aligning with the circuit board sensor, the RTP torsion spring is further in contact with the gate lock for pulling the lever back to the park position.

FIG. 31 a further succeeding view depicting the lever 18 in the returned to park position in which the gate lock 40 and pawl 44 are returned to the operating position not in contact with the return to park (RTP) cam 110 and with the bracket RTP sensor 120 in aligning with the circuit board sensor 126 (FIG. 32), this indicating that the cam 110 is in a normal operating state. Again, and in the RTP position, the bracket supported RTP sensor is not in alignment with the circuit board mounted sensor 126 (again FIG. 33), in which the torsion spring 129 is in contact with the gate lock 40 for pulling the lever 18 back to the Park position.

Figure 37:
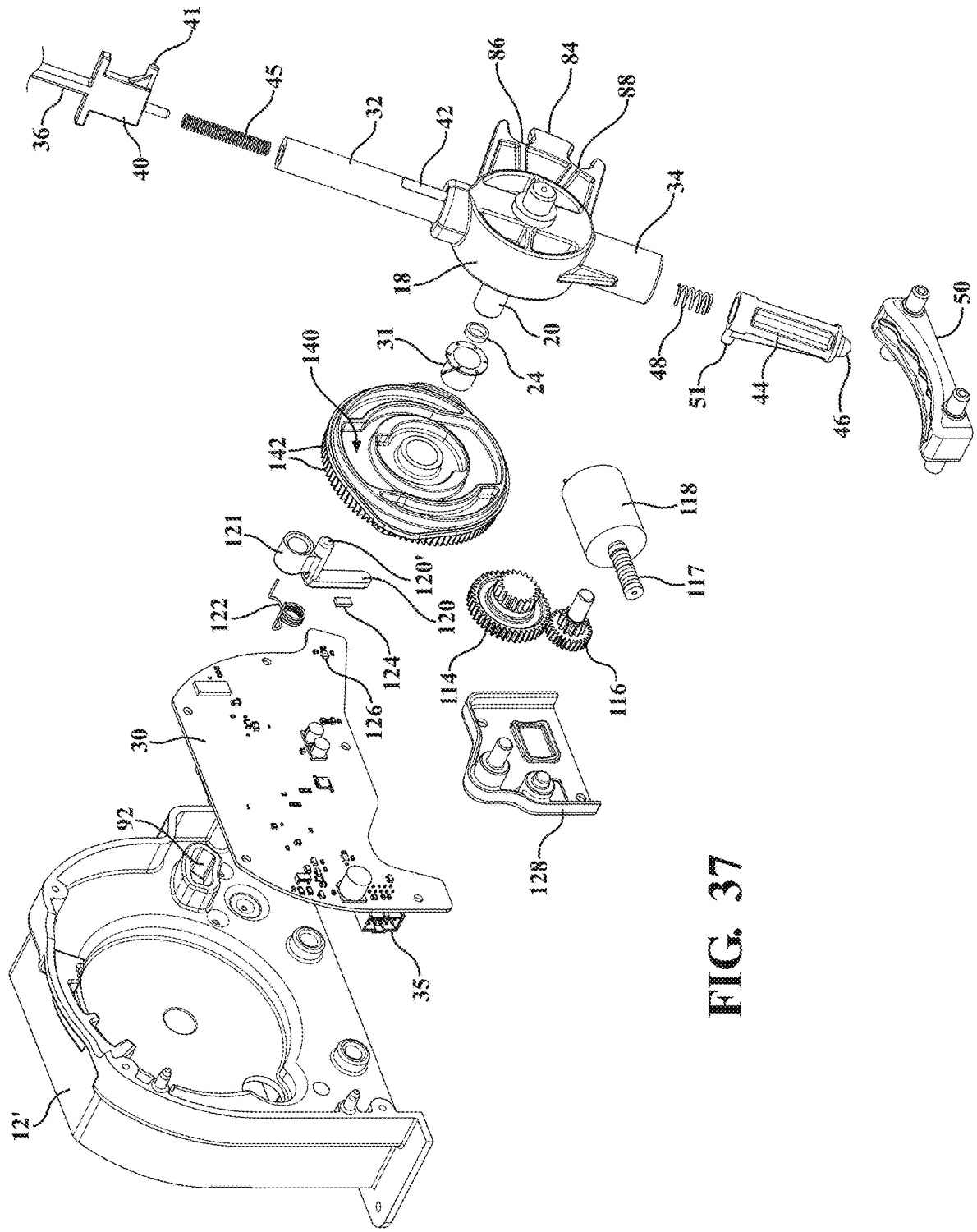
FIG. 37 is an exploded perspective view of return to park components of a lever shifter assembly, similar to as previously shown in FIG. 24, and according to a further preferred embodiment exhibiting a redesigned rotatable cam.
Figure 38:
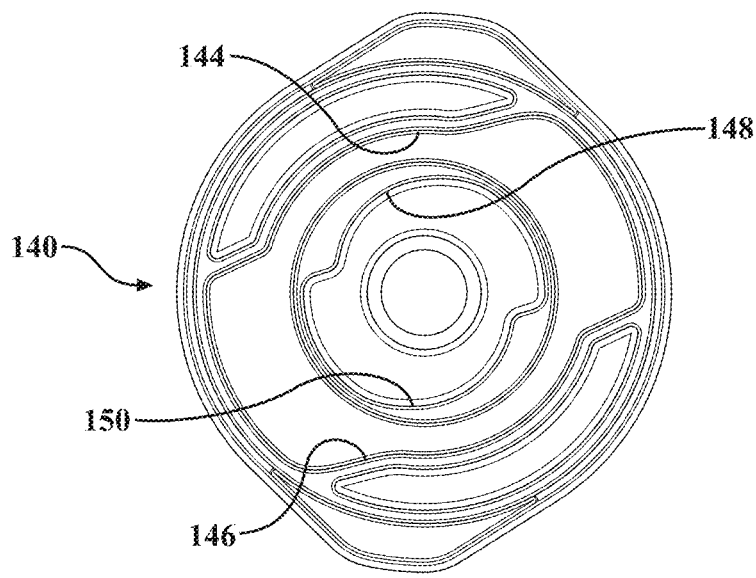
FIG. 38 is a plan view illustration of the redesigned return to park cam component of FIG. 37 and exhibiting sloping surfaces which, upon rotation, concurrently retract the upper spring loaded gate lock and lower spring loaded detent plate engaging pawl.

Referring now to FIG. 37, an exploded perspective view is shown of return to park components of an updated lever shifter assembly, similar to as previously shown in FIG. 24, and according to a further preferred embodiment. Of note, the return to park cam springs 129 of FIG. 24 are removed along with a redesigned of the rotatable RTP cam (generally at 140) and a minor reconfiguration of the main supporting superstructure, at 12'. Otherwise, identical components are repetitively numbered for purposes of ease of llustration and description.

As previously discussed, the shifter operations to physically return the shift lever 32 to the Park position on command from any position outside of Park. A return to park command being given (such as again corresponding to an external sensor input into the PCB board 30 such as resulting from a determined condition such as vehicle door being opened when the vehicle is out of Park).

The protocol for executing a RTP command again include the motor 118 with worm drive gear 117 being energized for rotating the worm gear and, consequently, the stacked gear 116 and stacked spur gear 114 in direct meshing contacting with exterior teeth 142 of the RTP gear 140. As further shown in FIG. 38, the RTP cam 140 includes sloping surfaces which compress and retract both the gate lock 40 (via spring 45) and the lower pawl 44 (via ball stud spring 48).

FIG. 38 again provides a plan view illustration of the redesigned return to park cam component 140 of FIG. 37 and exhibiting sloping surfaces (similar to as shown with the prior RTP cam 110) which, upon rotation, concurrently retract the upper spring loaded gate lock 40 and lower spring loaded detent plate engaging pawl 44. Corresponding to that shown in FIG. 25 for the previous RTP cam 110, redesigned outer sloped and edge defining surfaces 144/146 are provided for actuating the gate lock 40 (via its integral pin projection 41), in combination with inner sloped surfaces 148/150 for actuating the pawl 44 (via its pin 51).

Once fully retracted, the gate lock 40 interfaces with the cam 140, which allows it to influence the shift lever to the Park position (such again occurring without the need of separate torsional springs). The RTP cam 140 then continues to rotate (in the same direction) allowing the gate lock 40 and pawl 46 to return to the operating state (see again sensor position of FIG. 32). The RTP cam 140 continues to rotate until sensor bracket 120 and RTP sensor magnet 124 are read by the circuit board sensor 126, indicating that the system has reached Park position and the mechanism is back in the normal operating state. The sensor bracket further includes a protrusion 120' (see FIG. 30) which interfaces with the outside of the RTP cam 110 in order to rotate the sensor to align/misalign the magnet 124 at the end of the elongated arm of the RTP sensor 120.

Figure 39:
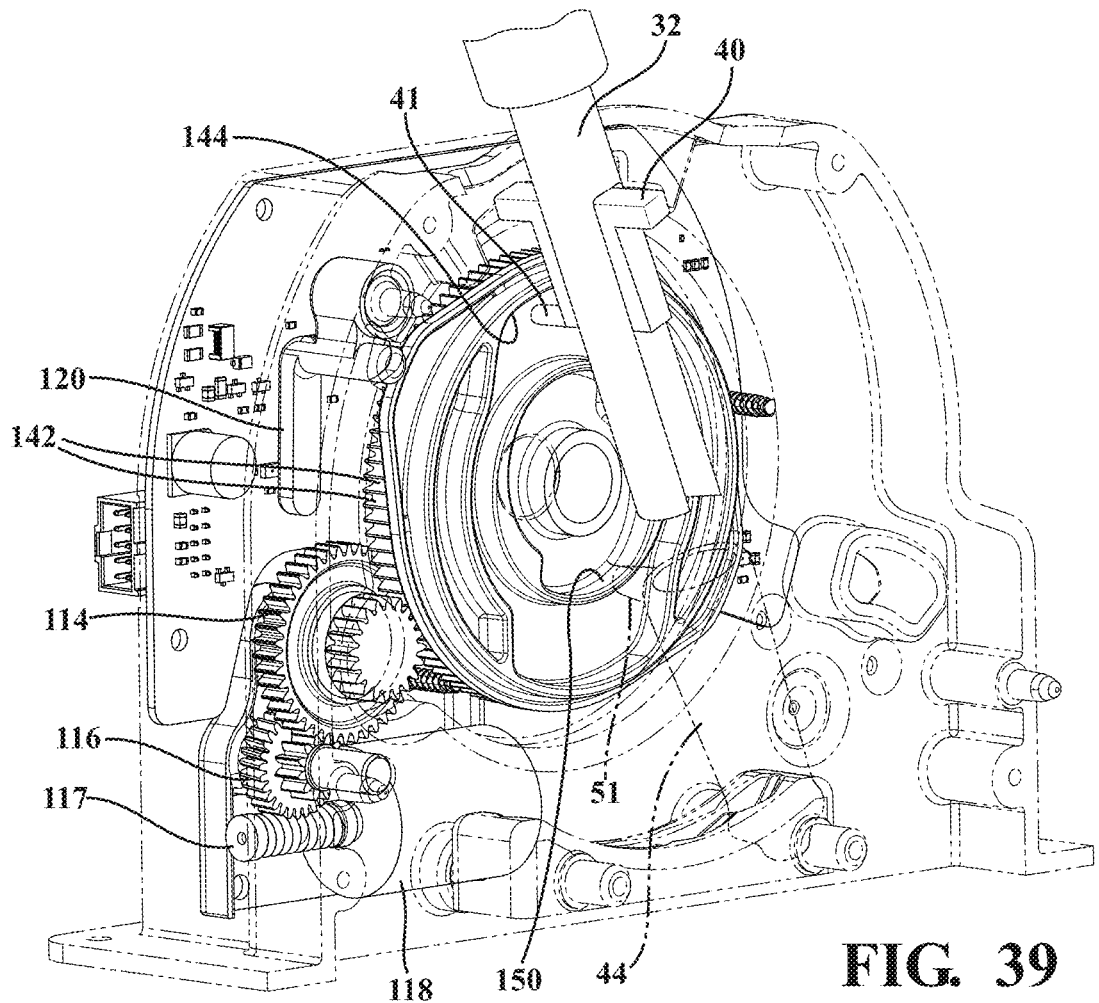
FIG. 39 is an isometric view with of the return to park cam, gate lock, pawl and return to park lever sensor shown in FIG. 37 in a normal operating state.
Figure 40:
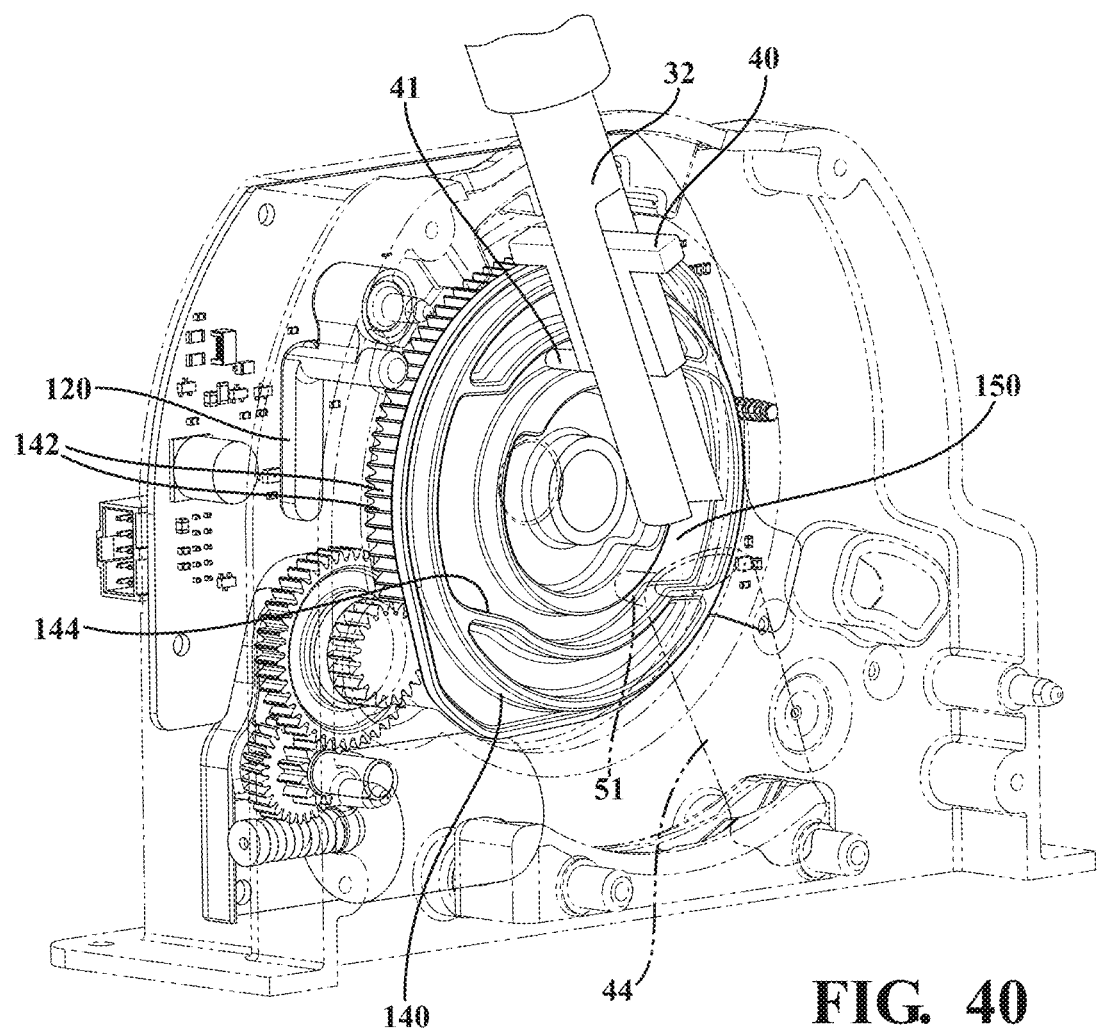
FIG. 40 is a further isometric view of the components in FIG. 39 in a retracted and return to park state.

Proceeding to FIG. 39, an isometric view is provided of the return to park cam 140, gate lock 40, pawl 44 and return to park lever sensor 120 shown in FIG. 37 in a normal operating state. FIG. 40 is a further isometric view of the components in FIG. 39 in a retracted and return to park state (see also sensor position again in FIG. 33).

Figure 41:
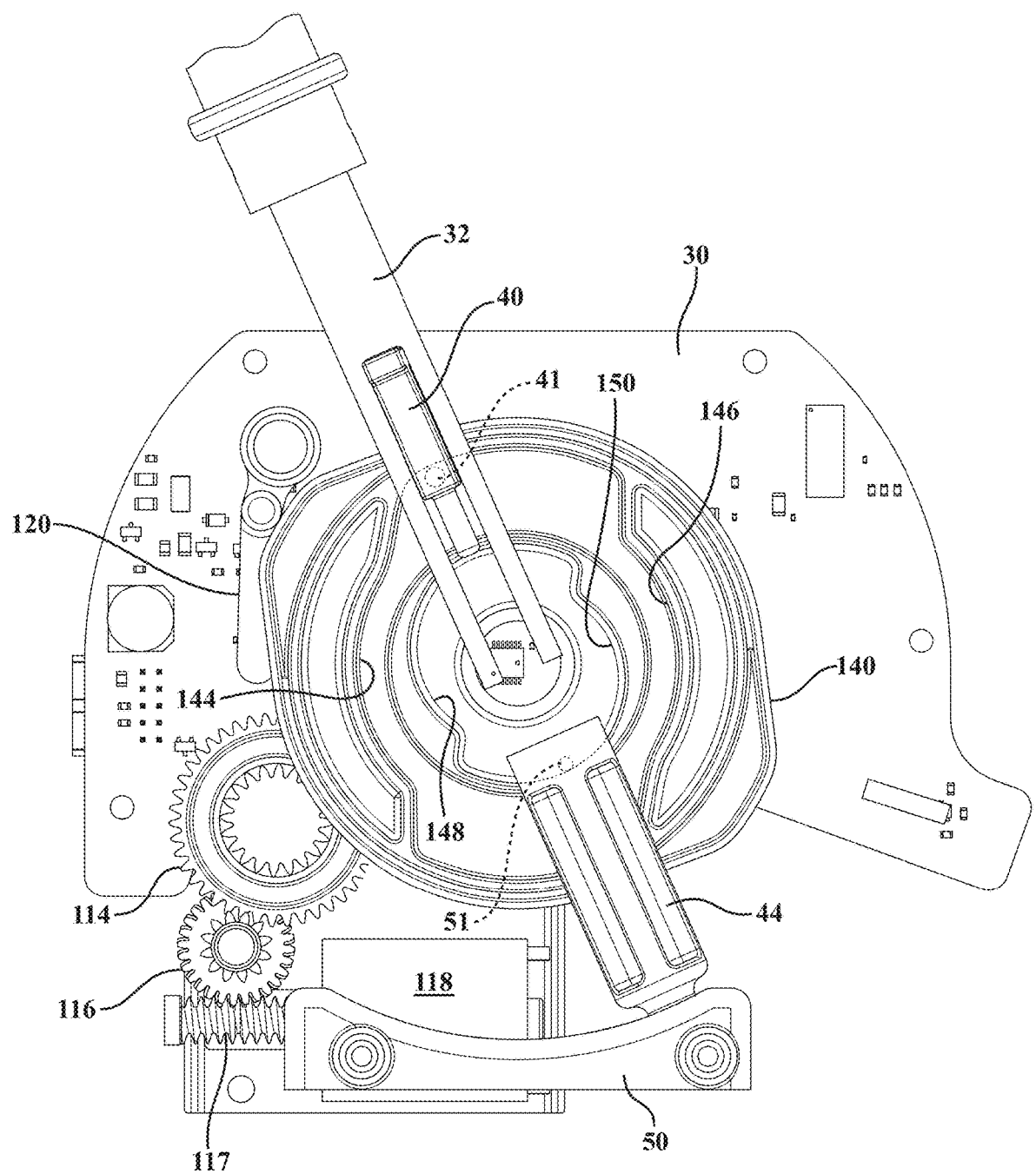
FIG. 41 is an enlarged plan view of the assembly in FIG. 39 with the gate lock in an operating position not in contact with the return to park (RTP) cam, with the pawl in an operating position not in contact with the cam and the bracket RTP sensor in aligning with the circuit board sensor.

Proceeding to FIG. 41, illustrated is an enlarged plan view of the assembly in FIG. 39 with the gate lock 40 in an operating position not in contact with the return to park (RTP) cam 140, with the pawl 44 in an operating position not in contact with the cam 140 and the bracket RTP sensor lever 120 is in alignment with the circuit board sensor 30. In this position, the pawl 44 and gate lock 40 are not in a compressed state, thereby facilitating normal operation.

Figure 42:
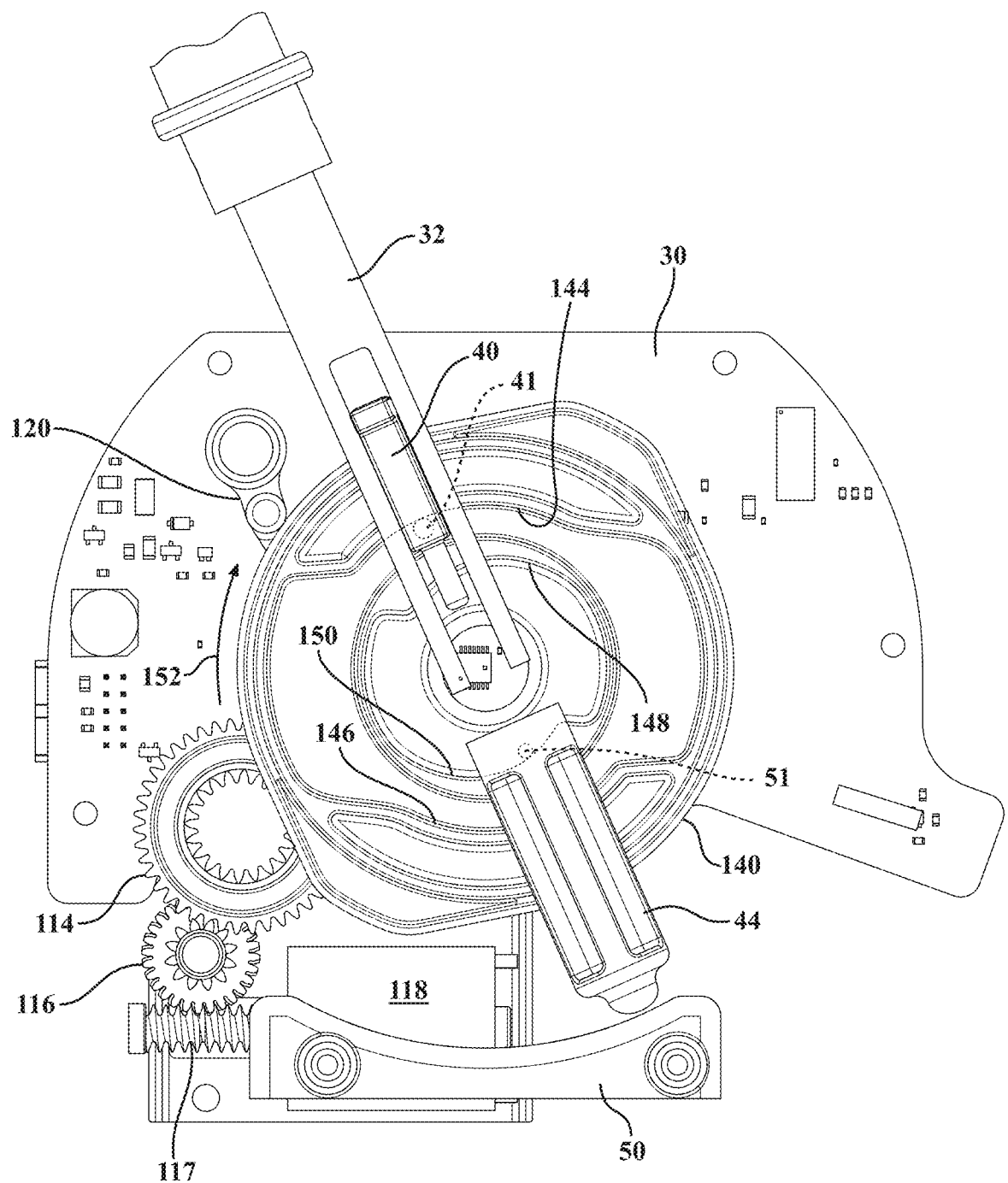
FIG. 42 is a succeeding view to FIG. 41 depicting the pawl and gate lock in the retracted position prior to initiating a return to park condition, with the gate lock in contact with the RTP cam and in a compressed state, the pawl likewise in contact with the RTP cam and in a compressed stated, and the bracket RTP sensor not in alignment with the circuit board sensor.

FIG. 42 is a succeeding view to FIG. 41 depicting the RTP cam 140 rotated in a clockwise direction (see arrow 152), such that the arc shaped inner wall surfaces (at 144 acting in coacting fashion with the gate lock 40 and at 150 concurrently acting in coacting fashion with the pin projection 51 of the pawl 44) compress the gate lock and pawl to a compressed and retracted position prior to facilitating/initiating a return to park condition. In this configuration, the gate lock 40 is in contact with the rotating RTP cam 140 in a compressed state, the pawl 44 likewise in contact with the RTP cam 140 in a likewise compressed stated, and further showing the bracket RTP sensor lever 120 is rotated out of alignment with the circuit board sensor 30.

Figure 43:
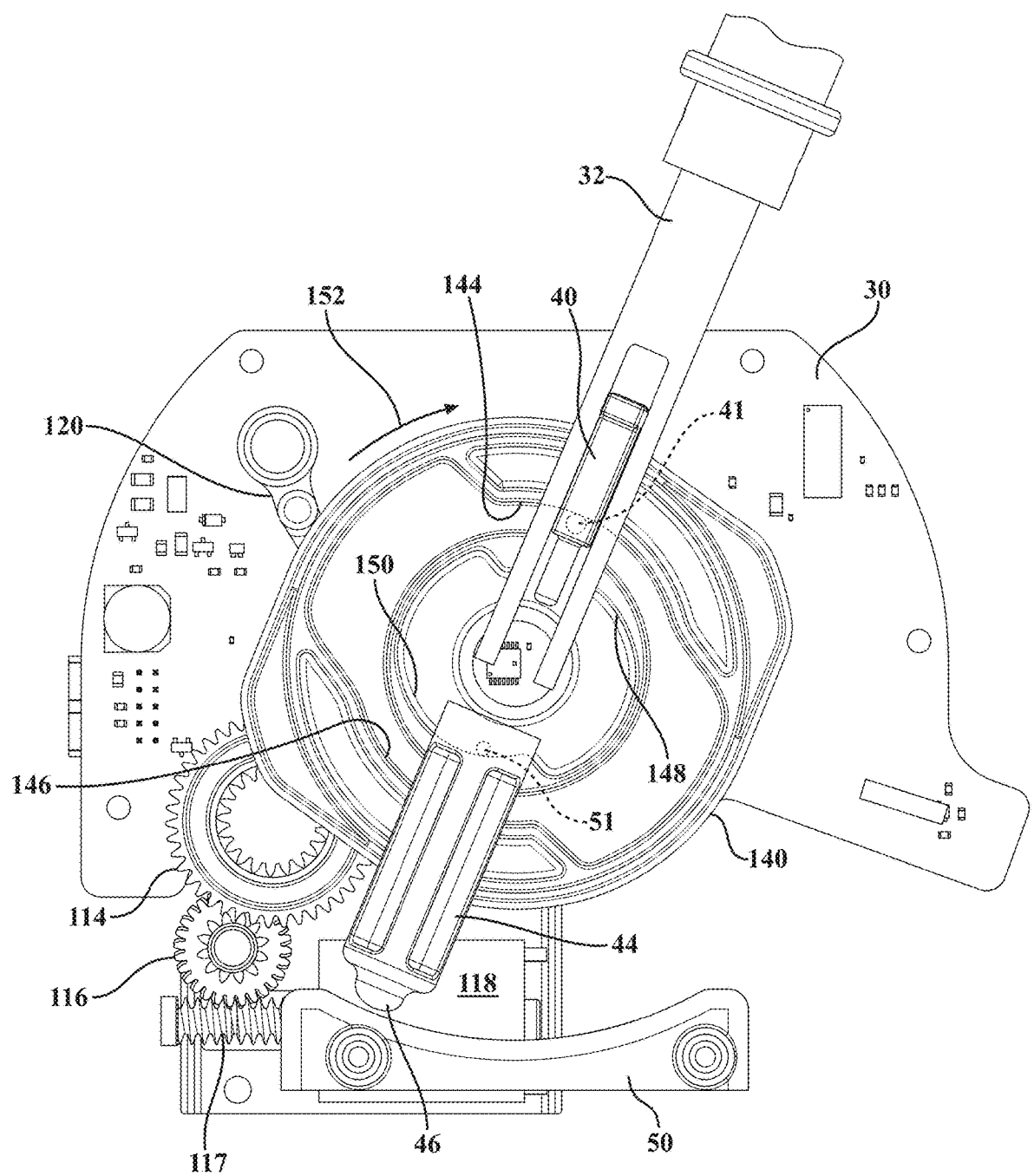
FIG. 43 is a further succeeding view depicting the pawl and gate lock in the retracted position for returning the shift lever to the park position, the gate lock and pawl remaining in contact with the RTP cam in a compressed state and the bracket RTP sensor positioned out of alignment with the circuit board sensor.

Proceeding to FIG. 43, a further succeeding view depicts the pawl 44 and gate lock 40 each being maintained in an inwardly compressed state or retracted position for returning the shift lever to the Park position. In this position, the gate lock 40 and pawl 44 remain in contact with the RTP cam 140 guide surfaces 144 and 150 in the compressed state and the bracket RTP sensor lever 120 remains in the position of FIG. 42 in which it is positioned out of alignment with the circuit board sensor 30. Continued rotation in direction 152 of the RTP cam 140 pivots the shift lever 32 in the so that the upper gate lock 40 and lower pawl 44 concurrently realign with the Park position as referenced by the associated underside gate boss 52 on the superstructure 14 and Park position 74 (see again FIG. 21) configured upon the detent plate 50. It is again noted that rotation of the shift lever back to the Park position in this variant does not require the RTP torsion springs 129 as described in the previous embodiment.

Figure 44:
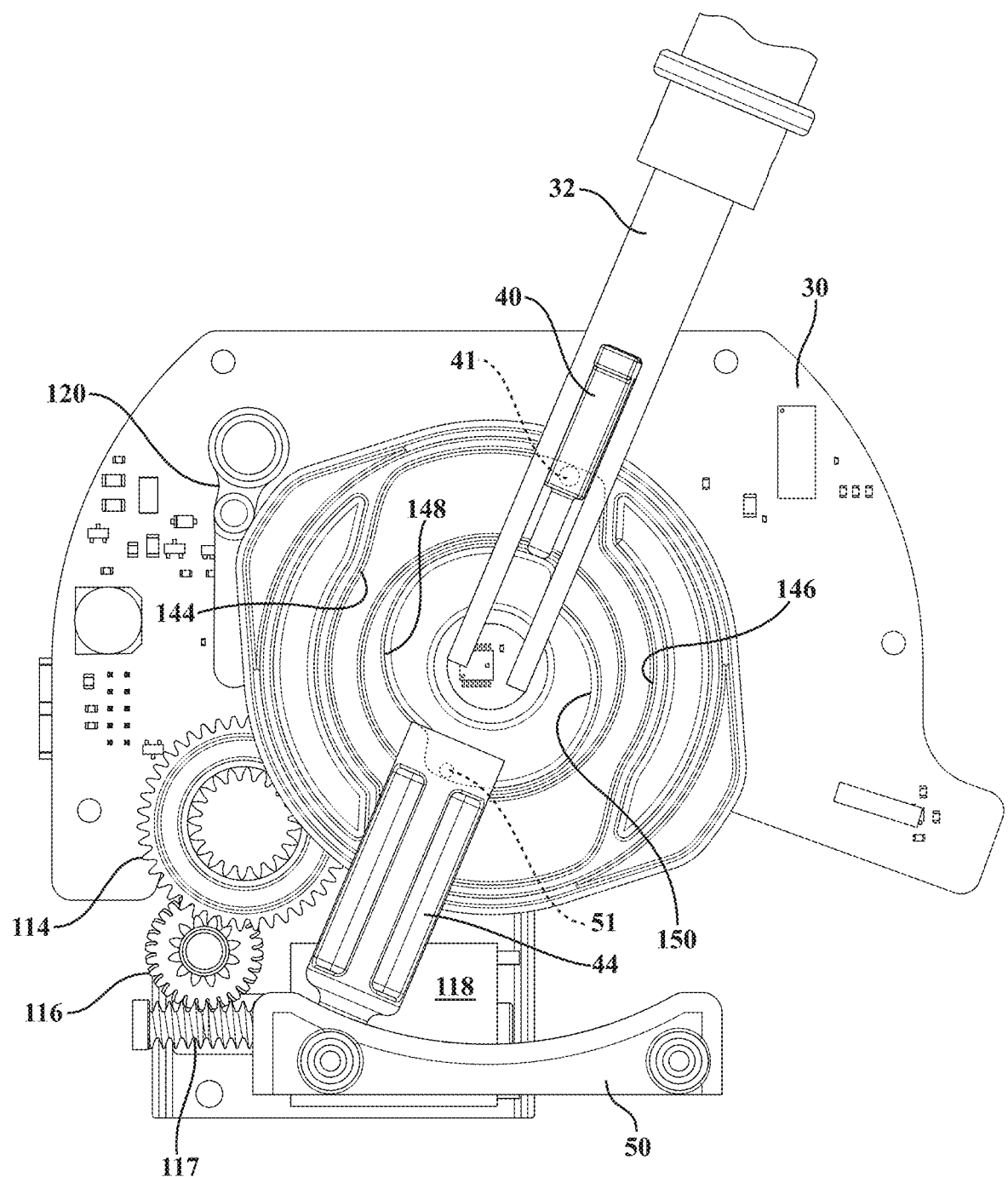
FIG. 44 a further succeeding view depicting the lever in the returned to park position in which the gate lock and pawl are returned to the operating position not in contact with the return to park (RTP) cam and with the bracket RTP sensor is in alignment with the circuit board sensor.

FIG. 44 a further succeeding view depicting the lever 32 in the returned to park position, in which the gate lock 40 and pawl 44 are returned to the operating position not in contact with the return to park (RTP) cam 140. The bracket RTP sensor lever 120 is in alignment with the circuit board sensor 126 (as shown in FIGS. 40-41). The gate lock 40 and pawl 44 are likewise both returned to the non-compressed operating position (note RTP cam 140 in same rotated position as in FIG. 41).

Figure 36:
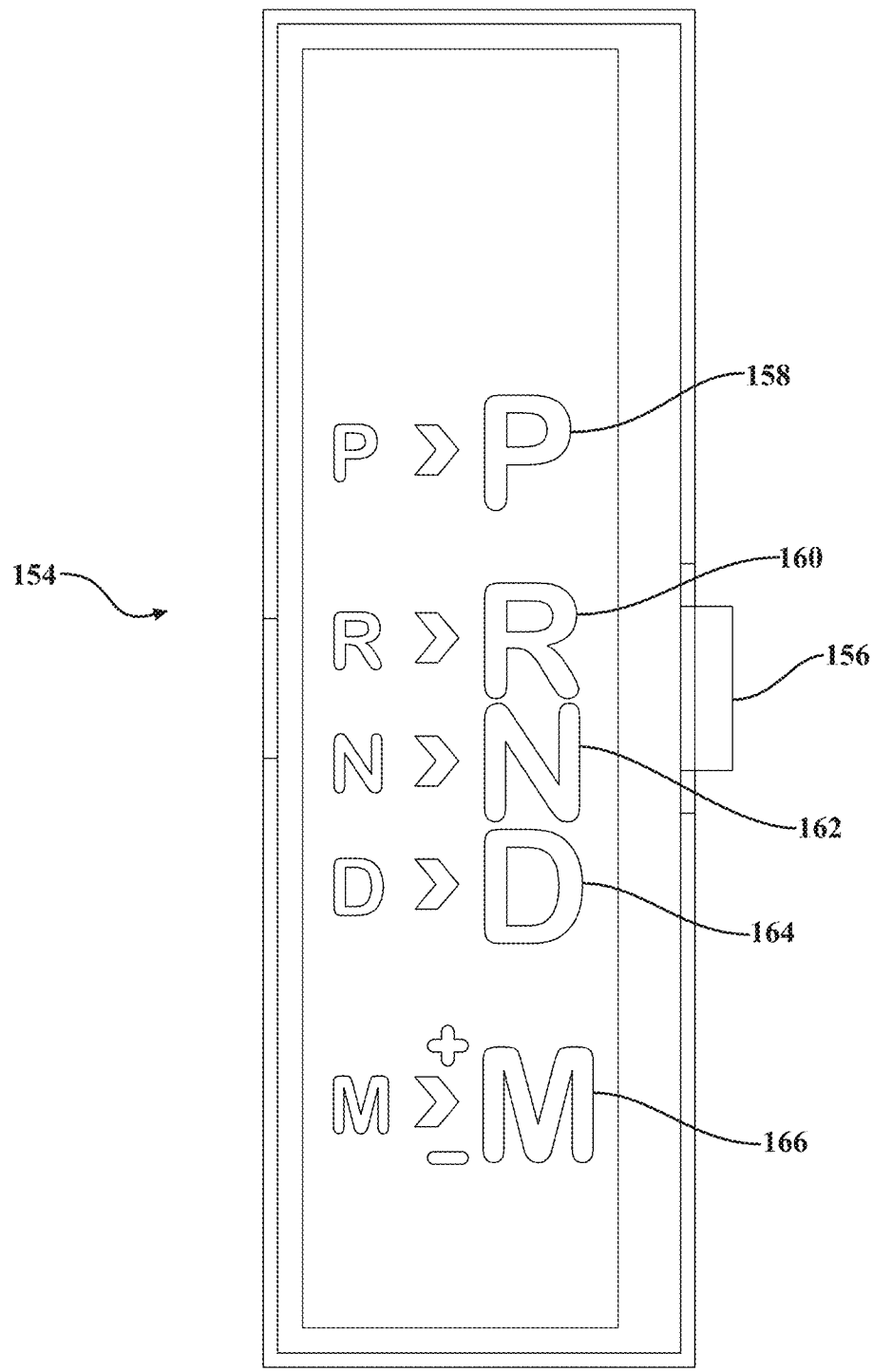
FIG. 36 is an illustration of a segmented graphical display incorporated into the shift lever of the present invention.

Finally, FIG. 36 is an illustration, generally at 154, of one non-limiting graphical display incorporated into the shift lever of the present invention. The graphical display, as shown in the exploded view of FIG. 1, can without limitation be positioned aside the shifter lever on the upper surface 12 of the main superstructure for displaying the shifter positions. A ribbon cable is further generally represented at 156, such extending from the display to the PCB board 30 receiver location 35, and which can include either integrated or separate power lines for operating the display, including illuminating the various shifter positions as identified at 158 (Park), 160 (Reverse), 162 (Neutral), 164 (Drive) and 166 (Manual +/− representing subset toggle positions), it being further understood that the display shifter positions correspond to those identified with respect to the opposing and reciprocal arrangement of the superstructure bosses (FIG. 13) and detent plate locations (FIG. 21).

Other features can include an illuminating component associated with the graphical display 154 further including any of LED elements and/or LCD segments integrated into a surface display for presenting a pixelated image. The illuminating component can include any of thin film transistor, organic light emitting diode or segmented display options, such including the segmented LCD elements such as provided in combination with LED backlight elements.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

We claim:

1. A straight gate vehicle transmission shifter assembly, comprising:
   a housing pivotally supporting an elongated shifter lever;
   a plurality of gate locations configured upon an underside of said housing and corresponding to at least each of Park, Reverse, Neutral, Drive and Manual gear positions;
   a gate lock incorporated into said lever and biased against a selected one of said gate locations;
   a pawl secured to a lower end of said lever and biased against a detent plate having a plurality of detent positions which correspond to each of said gate locations;
   a PCB board with processor and sensor integrated into said housing communicating with a motor connected to said shifter lever;
   upon said processor determining existence of a return to park condition, a return to park mechanism actuating said motor for returning said shifter lever to the Park position;
   said mechanism further including a rotating cam component having an exterior toothed profile operable by an output gear of said motor in a given rotational direction in order to successively retract said shifter lever from any shifter position outside of Park, and then to pivotally rotate said shifter lever in a return direction toward the Park position; and
   coil springs for biasing each of said gate lock and pawl against sloped surfaces of said rotating cam component.

2. The shifter assembly as described in claim 1, further comprising a stacked worm gear of said motor rotatably engaging said exterior toothed profile of said rotating cam component.

3. The shifter assembly as described in claim 1, further comprising a bracket sensor supported by said housing and, in response to pivoting of said cam component, displacing relative to said PCB sensor to signify achieving of the return to park condition of said shifter lever and to deactivate said motor.

4. The shifter assembly as described in claim 1, said housing further comprising a plurality of bosses configured within underside surface locations of said housing for engaging said gate lock corresponding to said gate locations.

5. The shifter assembly as described in claim 4, said underside bosses further comprising poly stable gated locations in order to prevent unintended shifting of said shifter lever between each of the Park to Reverse, Reverse to Park, Neutral to Reverse, Drive to Manual or Manual to Drive gear positions.

6. The shifter assembly as described in claim 4, further comprising said pawl exhibiting an arcuate surface profile corresponding to said shifter positions in a reverse arrangement to said gate lock engaging bosses.

7. The shifter assembly as described in claim 6, further comprising said shifter lever being monostable in said Manual gear and being alternatively pressed in a forward direction or pulled in an aft direction about a pivotal axis defined with said housing in order to select between subset Manual subset gears.

8. The shifter assembly as described in claim 4, a shift knob supported atop said shifter lever and incorporating a depressible knob button for retracting said gate lock from a selected one of said underside bosses corresponding to a given gear position.

9. The shifter assembly as described in claim 1, further comprising a graphical display positioned aside said shifter lever and upon said housing for displaying said shifter positions, a ribbon cable extending from said display to an input location of said PCB board.

10. The shifter assembly as described in claim 1, each of said gate lock and pawl further comprising an extending pin seating within upper and lower slots configured in said shifter lever and, in combination with said coil springs, defining a range of axial compression of said gate lock and pawl relative to said shifter lever.

11. A straight gate vehicle transmission shifter assembly, comprising:
   a housing pivotally supporting an elongated shifter lever;
   a plurality of gate locations configured upon an underside of said housing and corresponding to at least each of Park, Reverse, Neutral, Drive and Manual gear positions;
   a gate lock incorporated into said lever and biased against a selected one of said gate locations;
   a pawl secured to a lower end of said lever and biased against a detent plate having a plurality of detent positions which correspond to each of said gate locations;
   a PCB board with processor and sensor integrated into said housing communicating with a motor connected to said shifter lever;
   an operator lock function in each of the Park and Neutral shifter positions, said operator lock function further including a park lock sensor lever, a secondary motor incorporated into said housing and having a powered worm gear for actuating a rotary gear of said park lock sensor lever, a park lock magnet supported on said park lock sensor lever for providing feedback to a further sensor on said PCB board for indicating whether said park lock sensor lever has achieved a desired position; and
   upon said processor determining existence of a return to park condition, a return to park mechanism actuating said motor for returning said shifter lever to the Park position.

12. The shifter assembly as described in claim 11, further comprising a decoupling feature for preventing binding of said park lock sensor lever and by which a binding condition of said park lock lever results in permitted rotation of the park lock sensor lever in a unlock direction upon clearing of an obstruction to said park lock sensor lever.

13. The shifter assembly as described in claim 9, further comprising a friction lock arrangement configured between said rotary gear and an arm portion of said park lock sensor lever, said friction lock defining a torsional pre-load which, upon being exceeded by a torque applied to said arm portion, overcoming said friction lock to permit of said park lock sensor lever for resetting and in order to prevent said worm gear and said park lock sensor lever gear from binding due to overload.

14. The shifter assembly as described in claim 13, said housing further comprising a central support structure against which are secured first and second outer side covers to define a pair of package receiving interiors, a first of said interiors supporting said shifter lever, the other of said interiors supporting said park lock sensor lever, said motor and said PCB board, a channel formed in said central support structure and through which extends a portion of said park lock sensor lever for engaging said shifter lever in either of said Park or Neutral shifter positions.

15. The shifter assembly as described in claim 14, further comprising a pivot shaft associated with said shifter lever supported by said central support structure, a magnet incorporated into an end face of said pivot shaft in proximity to said sensor of said PCB board, rotation of which is read by a sensor supported on said PCB board and in communication with said processor to determine said gear position.

16. The shifter assembly as described in claim 12, said shifter leaver further comprising a structural extension proximate to said pivot shaft and within which is defined a pair recessed notch locations for receiving said arm portion of said park lock sensor lever in either of said Park or Neutral gear positions.

17. The shifter assembly as described in claim 16, further comprising an illuminating component associated with said graphical display and including any of LED's or segmented LCD panels with LED backlights.

* * * * *